(12) United States Patent
Powers, III et al.

(10) Patent No.: US 10,249,177 B2
(45) Date of Patent: Apr. 2, 2019

(54) RESPONSE SYSTEM AND METHOD

(71) Applicant: Rapid Response System I/P, LLC, Brighton, MI (US)

(72) Inventors: Benjamin W. Powers, III, Pinckney, MI (US); Peter L. Raciti, Northville, MI (US); Jeffrey T. Thompson, Brighton, MI (US)

(73) Assignee: Rapid Response System I/P, LLC, Brighton, MI (US)

( * ) Notice: Subject to any disclaimer, the term of this patent is extended or adjusted under 35 U.S.C. 154(b) by 0 days.

(21) Appl. No.: 15/314,847

(22) PCT Filed: Jun. 10, 2015

(86) PCT No.: PCT/US2015/035117
§ 371 (c)(1),
(2) Date: Nov. 29, 2016

(87) PCT Pub. No.: WO2015/191720
PCT Pub. Date: Dec. 17, 2015

(65) Prior Publication Data
US 2017/0103643 A1 Apr. 13, 2017

Related U.S. Application Data

(60) Provisional application No. 62/010,157, filed on Jun. 10, 2014.

(51) Int. Cl.
*G08B 27/00* (2006.01)
*E05G 1/00* (2006.01)
(Continued)

(52) U.S. Cl.
CPC ............ *G08B 27/001* (2013.01); *E05B 39/00* (2013.01); *E05B 45/06* (2013.01);
(Continued)

(58) Field of Classification Search
CPC .. G08B 27/00; G07C 9/00071; E05G 2700/02
See application file for complete search history.

(56) References Cited

U.S. PATENT DOCUMENTS 5,987,941 A * 11/1999 Zocco ................... A47B 81/005
109/59 R
5,992,094 A 11/1999 Diaz
(Continued)

*Primary Examiner* — Hai Phan
*Assistant Examiner* — Son M Tang
(74) *Attorney, Agent, or Firm* — Quinn IP Law

(57) ABSTRACT

A system and method for responding to a triggering event occurring on a premises includes accessing a vault compartment of a vault located on the premises to retrieve a responder tool kit including a ballistic vest, a portable communication device, and a defense device for use in responding to the triggering event. A controller located in the vault compartment is in communication with a monitoring station located off the premises and a biometric authentication device located external to the vault including a bioscanner such as an iris scanner for collecting biodata to authenticate a person external to the vault as a qualified rapid responder. The controller at the time of authenticating the qualified and authorized rapid responder outputs an alarm signal to the monitoring station, alerting the monitoring station to contact emergency services, and unlocks the vault to provide access to the responder tool kit located in the cage assembly.

31 Claims, 12 Drawing Sheets

(51) Int. Cl.
*E05B 39/00* (2006.01)
*E05B 45/06* (2006.01)
*E05B 65/00* (2006.01)
*E05G 1/02* (2006.01)
*F41C 3/00* (2006.01)
*F41C 7/00* (2006.01)
*F41H 1/02* (2006.01)
*F41H 9/10* (2006.01)
*F41H 11/00* (2006.01)
*F41H 13/00* (2006.01)
*G07C 9/00* (2006.01)
*G08B 17/08* (2006.01)
*H04N 7/18* (2006.01)
*G08B 19/00* (2006.01)
*E05B 47/00* (2006.01)

(52) U.S. Cl.
CPC ............ *E05B 65/0075* (2013.01); *E05G 1/00* (2013.01); *E05G 1/02* (2013.01); *F41C 3/00* (2013.01); *F41C 7/00* (2013.01); *F41H 1/02* (2013.01); *F41H 9/10* (2013.01); *F41H 11/00* (2013.01); *F41H 13/0012* (2013.01); *G07C 9/00071* (2013.01); *G08B 17/08* (2013.01); *H04N 7/185* (2013.01); *E05B 2045/0695* (2013.01); *E05B 2047/0067* (2013.01); *E05B 2047/0084* (2013.01); *G08B 19/00* (2013.01)

(56) References Cited

U.S. PATENT DOCUMENTS

| | | | | |
|---|---|---|---|---|
| 6,260,300 B1* | 7/2001 | Klebes | ................ | F41A 17/066 206/317 |
| 6,510,642 B2* | 1/2003 | Riener | ................ | F41A 17/063 342/45 |
| 6,538,623 B1 | 3/2003 | Parnian et al. | | |
| 6,678,984 B1* | 1/2004 | Rapp | ................ | F41A 17/066 42/70.01 |
| 6,806,807 B2* | 10/2004 | Cayne | ................ | G07C 9/00087 340/5.52 |
| 7,497,376 B2* | 3/2009 | Landwirth | ......... | G07C 9/00912 235/379 |
| 7,511,601 B2* | 3/2009 | Eisenberg | ............. | G06K 17/00 340/10.1 |
| 7,959,070 B1 | 6/2011 | Gromley et al. | | |
| 8,186,188 B1* | 5/2012 | Brown | ................ | E05G 1/005 109/45 |
| 8,474,704 B1 | 7/2013 | Grimm et al. | | |
| 8,502,644 B1* | 8/2013 | Newman | ............ | G06Q 10/0833 340/5.73 |
| 9,145,728 B1* | 9/2015 | LeBlanc | ................ | E05G 1/024 |
| 2002/0121967 A1* | 9/2002 | Bowen | ................ | B60Q 1/52 340/425.5 |
| 2002/0196126 A1* | 12/2002 | Eisenberg | ............. | G06Q 30/02 340/7.48 |
| 2005/0269404 A1 | 12/2005 | Landwirth et al. | | |
| 2006/0011111 A1* | 1/2006 | Stoddard | ................ | E05G 1/00 109/1 R |
| 2006/0108241 A1* | 5/2006 | Smith | ................ | A62B 99/00 206/223 |
| 2007/0060313 A1 | 3/2007 | Mathis et al. | | |
| 2007/0085655 A1* | 4/2007 | Wildman | .................. | E05G 1/04 340/5.53 |
| 2007/0198848 A1 | 8/2007 | Bjorn | | |
| 2007/0241010 A1* | 10/2007 | Giebel | .................. | A47B 81/00 206/317 |
| 2007/0256615 A1 | 11/2007 | Delgrosso et al. | | |
| 2008/0297788 A1* | 12/2008 | Rowe | .................... | A61B 5/117 356/300 |
| 2009/0146829 A1 | 6/2009 | Whillock | | |
| 2009/0254572 A1 | 10/2009 | Redlich et al. | | |
| 2011/0079170 A1* | 4/2011 | Al-Mutairi | ................ | E05G 1/06 109/23 |
| 2011/0288685 A1* | 11/2011 | Usem | ..................... | G07F 17/12 700/275 |
| 2012/0060681 A1* | 3/2012 | Hoenes | ................... | F41H 1/02 89/36.02 |
| 2012/0145777 A1 | 6/2012 | Brindley et al. | | |
| 2012/0153740 A1* | 6/2012 | Soar | ........................ | F41H 1/02 307/104 |
| 2012/0228243 A1* | 9/2012 | Crigger | ................ | G07C 9/00158 211/7 |
| 2013/0008105 A1 | 1/2013 | Thomson | | |
| 2014/0069827 A1* | 3/2014 | Thede | ................... | B66B 5/0006 206/223 |
| 2014/0196636 A1* | 7/2014 | Deweese | ................ | E05G 1/00 109/23 |
| 2014/0285668 A1* | 9/2014 | Deweese | ................ | H04N 7/188 348/156 |
| 2015/0332528 A1* | 11/2015 | McGinnis | ........... | E05B 65/0075 109/38 |
| 2016/0053526 A1* | 2/2016 | Dittrich | .................... | E05G 1/04 109/38 |
| 2017/0103643 A1* | 4/2017 | Powers, III | .......... | G08B 27/001 |

* cited by examiner

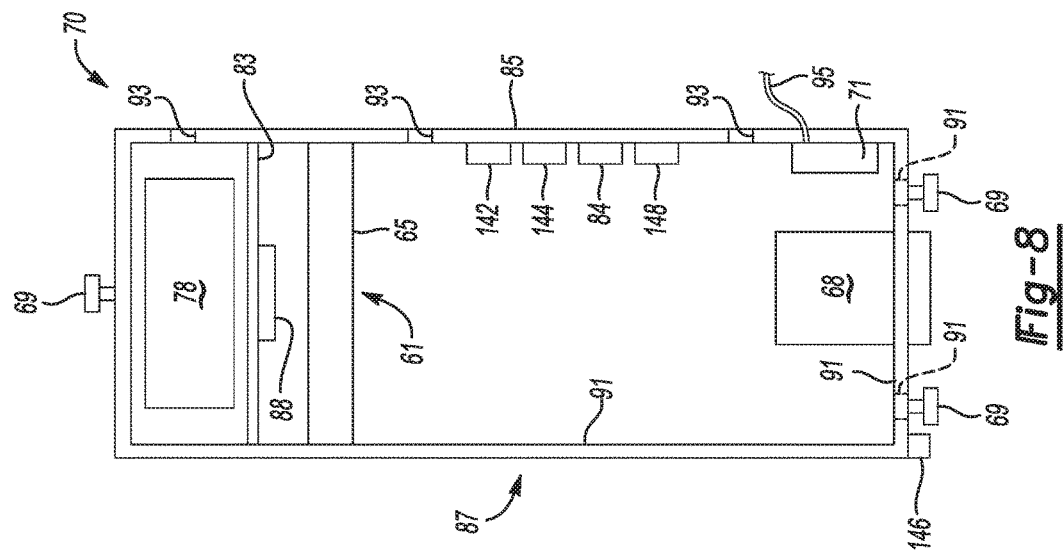
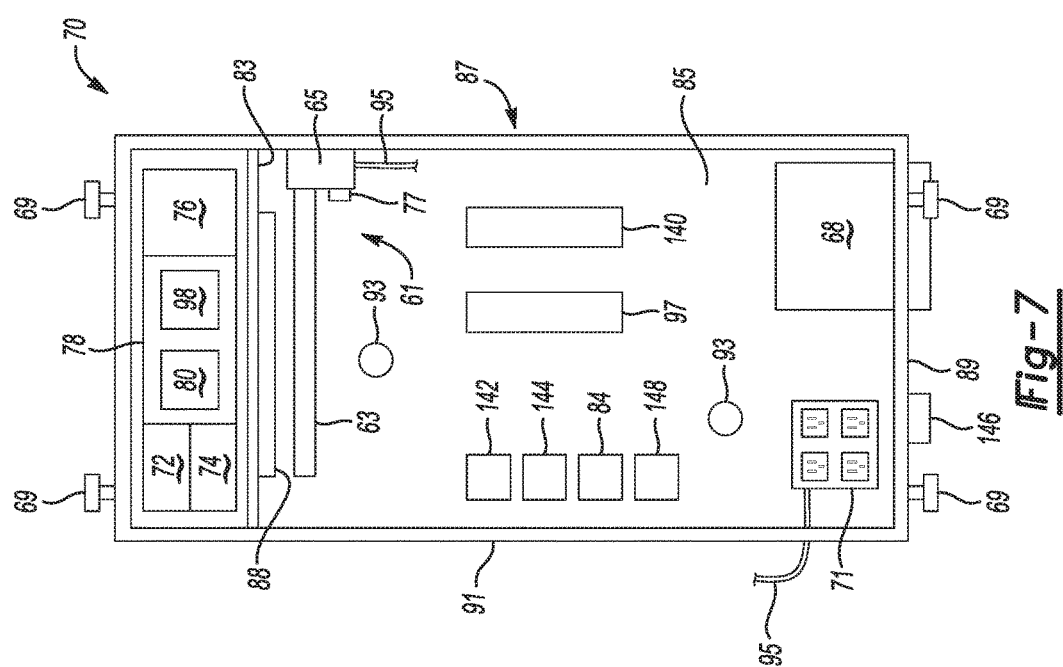

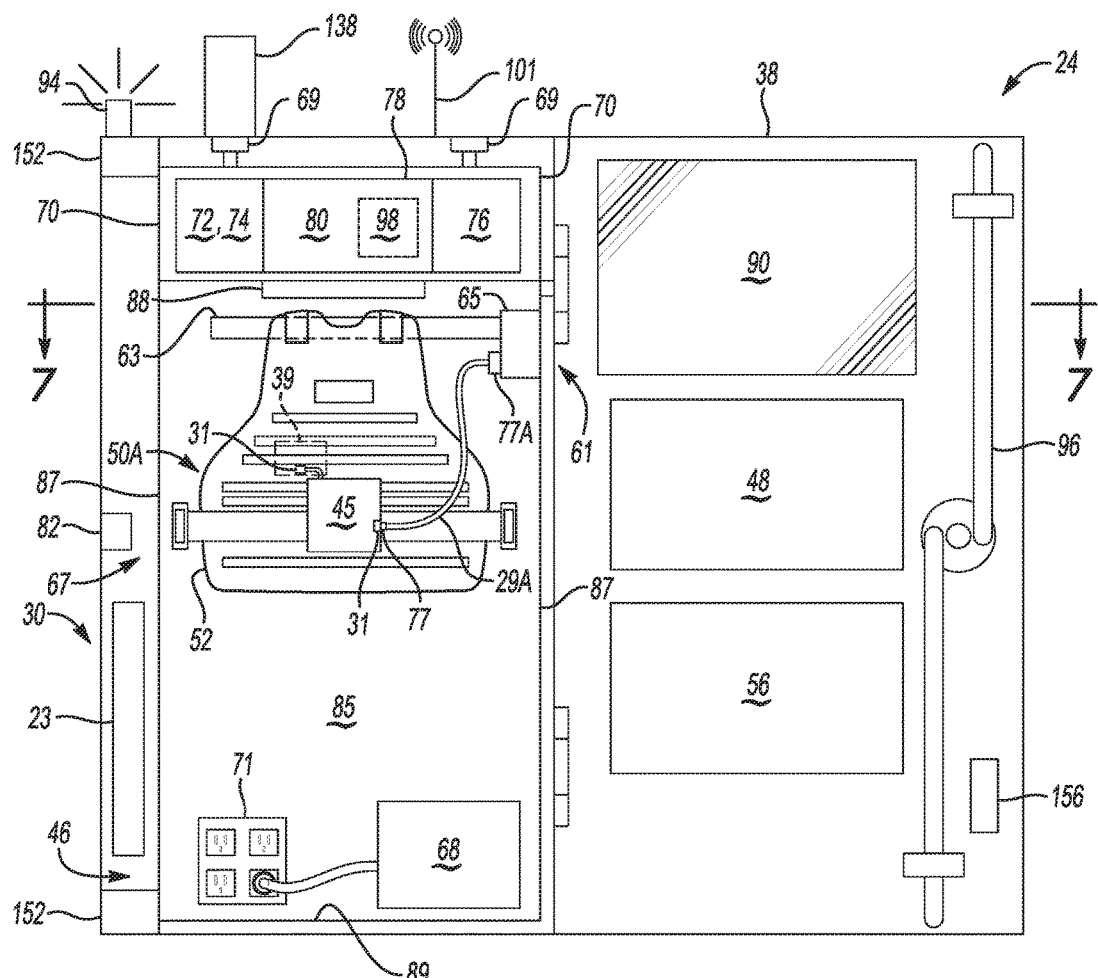
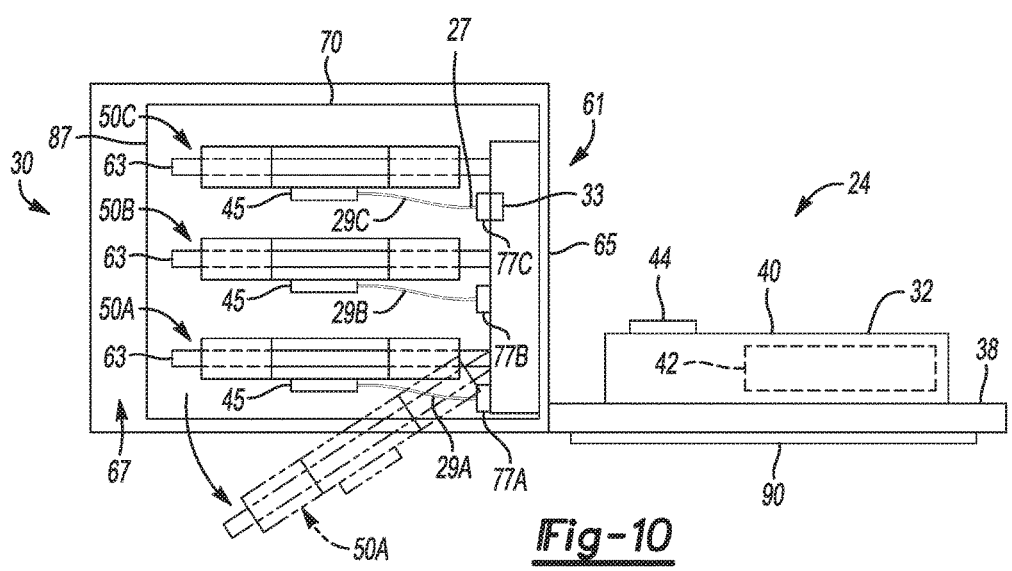

RESPONSE SYSTEM AND METHOD

CROSS-REFERENCE TO RELATED APPLICATIONS

This application claims priority to and the benefit of PCT Application PCT/US2015/035117 filed Jun. 10, 2015, and U.S. Provisional Patent Application No. 62/010,157, filed on Jun. 10, 2014, which are each hereby incorporated by reference in their entirety.

TECHNICAL FIELD

The present disclosure relates to a method and system for providing a rapid defensive response to a triggering event, and more specifically a method and system for rapidly responding to an incursion of a premises.

BACKGROUND

The amount of damage which may be imposed by an attacker during an incursion of a premises, including injury and loss of life to premises members, is proportional to the length of time which is elapsed in responding to the incursion, e.g., the attack. The response time to the incursion typically includes the length of time to provide notification that an attack has been initiated to emergency services, such as police, fire or other off-premises emergency responders, and the length of time for a responder to be available on-premises to respond to the attacker directly, where responding directly to the attacker may include carrying out defensive actions against the attacker.

SUMMARY

By reducing the amount of time until notification of an incursion at a premises is given to emergency services ("notification time"), and by reducing the amount of time until a responder can initiate a defensive response to the attacker ("response time"), the amount of damage which may be imposed by an attacker during an incursion can be reduced. In a non-limiting illustrative example, the incursion, also referred to herein as a triggering event, may be an attack by an active shooter on a premises which is an institutional facility such as a school or hospital, where the attacker is armed with one or more weapons capable of being deployed by the attacker to inflict bodily harm on inhabitants of the facility. A system and method for rapidly responding to an incursion of a premises by an attacker is provided herein. The system and method, referred to herein respectively as a "rapid response system" and a "rapid response method" includes a secure means of providing notification of the occurrence of the incursion to emergency services and/or to inhabitants of the premises, and further includes providing immediate access to a defensive responder tool kit which is securely located on-premises to a "rapid responder" who is present on-premises at the time the incursion is initiated.

The term "rapid responder" as used herein and as will be described in further detail, is an individual who is routinely on premises, for example, an employee of an institution located on-premises, and who has been trained and qualified to respond to an incursion, to access an on-premises response station which provides notification of the incursion to a monitoring station which then provides notification to emergency services and to inhabitants of the premises, to access a defensive responder tool kit secured in a vault of the response station, and to deploy the defensive responder tool kit to initiate a defensive action against the attacker and/or otherwise respond to the incursion, where response to the incursion may also include providing emergency medical treatment to victims of the attacker. A "rapid responder," is distinguished from an "emergency responder," as those terms are used herein. A "rapid responder" is a routine inhabitant of the premises, such as an employee of an institution located on-premises, who has been specially trained and qualified in the use of the "rapid response system" described herein. A rapid responder may also be referred to herein as a "qualified responder." A rapid responder can be further categorized as one of an "authorized" rapid responder and an "unauthorized" rapid responder, where the controller of a response station is configured to only authenticate "authorized" rapid responders to access the vault compartment of the response station, and to deny access to an "unauthorized" rapid responder. In contrast, an "emergency responder" is a responder who is located off-premises, e.g., who is not a routine inhabitant of the premises, and who travels to the premises in response to an alarm or other notification that an incursion or triggering event has occurred. By way of example, "emergency responders" could include police, fire, emergency medical services (EMS), military, or other security personnel not typically located on-premises in the absence of an incursion. The term "rapid response" refers to a response using the rapid response system and/or the rapid response method described herein, wherein the term "rapid" is defined as occurring more quickly, e.g., in a shorter elapsed time, than the time which would have been elapsed in the absence of the rapid response system and/or method described herein to provide notification of the triggering event to emergency services and/or warning to premises inhabitants, and/or to initiate a defensive response to the attacker. Alternatively, the term "rapid response" refers to a response having a notification time and/or response time which is less than (quicker than) the average or historic notification time and/or response time for known comparable incursions, where a "comparable incursion" is a similar incursion occurring on a similarly configured premises by a similarly armed attacker.

The rapid response system described herein includes a monitoring station located external to a premises and in communication with one or more response station(s) located on the premises. Each response station includes a controller in communication with a facility administration station on the premises and with the monitoring station, where the controller in an installed condition is positioned in a vault compartment of a vault located at the response station. Access to the vault compartment of the vault is secured by a station access mechanism including a biometric authentication device in communication with the controller. The biometric authentication device and the controller are configured to unlock the vault upon authentication of a person external to the vault by the biometric authentication device, which in the example shown includes a bioscanner. The bioscanner is configured to receive biodata from a person external to the vault. The biodata is received by the controller and compared to biodata of at least one rapid responder authorized to access the cage assembly. When the biodata from the person external to the vault is matched to the biodata of a authorized rapid responder, the person is authenticated as an authorized rapid responder and the vault is unlocked to provide access to the cage assembly and vault compartment by the authorized responder. In one example, the bioscanner is an iris scanner and the biodata of the person to be authenticated includes an iris image of the person. In one example, access to the biometric authentication device is secured by a token-based authentication device, and presentation of an authorized authentication token to the token-based authentication device is required to gain access to the biometric authentication device. In one example, the authorized authentication token is associated, by the controller, with a specific authorized responder and the biometric authentication device includes an adjusting mechanism for adjusting the position of the bioscanner. The system is configured such that presentation of the authentication token to the token-based authentication device actuates the adjusting mechanism to adjust the bioscanner to a position defined by the biodata of the specific authorized responder associated with the authentication token.

A responder tool kit including a ballistic vest is removably positioned in the vault compartment and is removable by the authorized responder for use in responding to an incursion of the premises by an attacker. The responder tool kit includes a portable communication device for communicating with the portable communication devices of other responder tool kits and/or with emergency service providers, and can further include a defense device, such as a weapon, where responding to the incursion or attacker may include use of the defense device to impede and/or immobilize the attacker. One or more defense devices can be provided on the responder tool kit and/or in the vault compartment for retrieval by the authorized rapid responder accessing the cage assembly. For example, the defense devices included in the vault compartment with the responder tool kit can include one or more of a defensive spray such as pepper spray, a truncheon (also referred to as a baton, billy club or nightstick), a knife, a stun weapon such as a Taser®, a firearm, handgun, and/or a long arm weapon. Ammunition for each type of defense device can be provided on the responder tool kit and/or stored in the vault compartment for retrieval by an authorized rapid responder accessing the vault. The responder tool kit can include additional items useful to a rapid responder in responding to an incursion, such as a portable light source such as a flashlight, an auxiliary power pack to power one or more portable communication devices or other electrically powered components on the responder tool kit, a first aid kit and/or trauma kit, a facility map, etc. The portable communication devices included on the responder tool kit can include one or more of a two-way radio, a real time location pendant, a body camera or other body video surveillance device, and a cellular phone.

The controller is configured to send a notification alert, e.g., to output an alarm signal, to the monitoring station upon authentication of the person as an authorized rapid responder and unlocking of the vault. The notification alert, e.g., the alarm signal, can be transmitted to emergency services by the monitoring station to request emergency services response to the incursion. The response station includes a communication module position in the vault compartment. The communication module is in communication with the monitoring stations and includes a communication input/output interface for communication between the authorized rapid responder and the monitoring station, for example, for the authorized responder accessing the vault compartment to communicate information regarding the incursion to the monitoring station. The monitoring station is selectively in communication with an emergency services provider, and is configured to place an emergency service provider in communication with the communication module of the response station via monitoring station, for direct communication between the emergency service provider and the authorized responder at the response station.

The response station includes one or more duress switches in communication with the vault controller and/or the monitoring station, where activating any one of the duress switches initiates at least one of a duress call to the monitoring station and lockout of access to the vault compartment for a minimum period of time. By way of illustrative example, a duress switch can be located on or near one or more of the access mechanism, the vault, and the vault compartment. In one example, the vault station further includes one or more intrusion sensors in communication with the controller. In one example, at least one intrusion sensor is a seismic sensor located in the vault compartment. The intrusion sensor is configured to output an intrusion signal to the controller upon detecting an intrusion condition of the vault, where an intrusion condition can include an attempt by an unauthorized person to access the vault and/or vault compartment, and/or to damage or disable one or more of the access mechanism, the vault, and the controller. The controller outputs an intrusion alarm to the monitoring station in response to the intrusion signal. The monitoring station vets the intrusion signal and contacts emergency service providers when a triggering event is indicated.

The response station includes an uninterruptible power supply located in the vault compartment and electrically connected to the controller. The uninterruptible power supply is electrically connected to a power source which is external to the vault. The response station can further include a tool kit charging module which in an installed condition is positioned in the vault compartment and is electrically connected to the uninterruptible power supply and arranged such that when responder tool kit is positioned in the vault compartment, one or more electrically powered devices such as the portable communication device is electrically connected to the tool kit charging module. As such, the electrically powered devices on the responder tool kit are continuously maintained in a fully charged and powered state when the responder tool kit is located in the vault compartment.

The response station can include a cage assembly which in an installed condition is positioned within the vault compartment of the response station, and includes one or more of the controller, the communication module, the uninterruptible power source, the tool kit charging module, and electrical circuitry for connecting the external power source to one or more of the controller, the communication module, the uninterruptible power source, and the tool kit charging module. The cage assembly, in an non-limiting example, includes a cage structure to which the controller, the communication module, the tool kit charging module, the electrical circuitry are mounted, and can further include a light for lighting the vault interior and a tool kit holder for removable attachment of one or more responder tool kits. In one example, the tool kit holder includes at least one pivoting arm on which a responder tool kit can be positioned for easy access and retrieval by a rapid responder accessing the vault compartment. In one example, the cage assembly can be preconfigured with the controller, communication module, tool kit charging module, electric circuitry, etc., mounted to the cage prior to installation of the cage assembly to the vault compartment. The preconfigured cage assembly is advantaged by providing a consistent and predictable arrangement of the components in the vault compartment, where the response time of a rapid responder in using and retrieving the components, including the communication module, responder tool kit, etc., during an incursion event can be minimized by presenting the components in a consistent and predictable arrangement in the vault compartment. The cage assembly can include adjustment features to adapt and/or fit the cage assembly to various sizes of vault compartments without having to modify the predictable arrangement of the components in the cage assembly.

The system can include a beacon in communication with the controller of each response station, where the beacon in an installed condition is external to the vault and located proximate to the response station such that the beacon is readily visible to inhabitants of the premises, including rapid responders, to act as a visual indicator that a response station including the vault is located proximate to the beacon. For example, a beacon can be located in a hallway of a premises near the door of a room including a response station, to provide a visual indicator of the response station location to a rapid responder in the hallway. The beacon can be activated to operate in one or more modes, where each operating mode may be characterized, for example, by emitting a light, emitting a light of a predetermined color, emitting a light in a predetermined light pattern (flashing strobe, etc.), emitting an audible signal, emitting an audible signal in a predetermined pattern, and/or a combination of these. In one example, the beacon is activated in a predetermined mode when the controller outputs the alarm signal, to notify inhabitants of the premises, including rapid responders, that an alarm signal has been initiated and/or to provide notification of the occurrence of an incursion or other triggering event. In one example, the premises can include one or more shot detectors configured to output a shot detection signal upon detecting a shot occurring on the premises. In this example, the beacon can be activated in a predetermined mode when the shot detector outputs the shot detection signal. In one example, the response station includes an inventory sensor to sense the presence of a responder tool kit in the vault compartment, and the beacon is activated in a predetermined mode when the inventory sensor senses removal of the last remaining responder tool kit from the vault compartment. In this example, the activated beacon indicates to a rapid responder that the response station proximate that beacon has been depleted of all responder tool kits, and as such provides a visual indicator to the rapid responder to proceed to another response station to retrieve a responder tool kit, thus avoiding any loss in response time due to a rapid responder accessing a vault from which the responder tool kits have already been removed by other rapid responders.

A method of responding to a triggering event, which may be an incursion of a premises by an attacker, is provided herein. The method includes accessing a response station by a person, where the person is authenticated as an authorized rapid responder by presenting a biometric authentication factor to a biometric authentication device in communication with a controller positioned in the vault compartment of the response station. The biometric authentication device includes a bio scanner, such as an iris scanner, for collecting biodata from the biometric authentication factor, e.g., the person's iris, for authentication by the controller. The controller compares the collected biodata to biodata of authorized rapid responders stored in the memory of the controller, to determine whether the person should be authenticated as an authorized rapid responder and allowed access to the vault compartment. The method can include accessing the biometric authentication device only after authentication of the person by a token-based authentication device, where authentication to the token-based authentication device can require presenting an authentication token such as a magnetic card, a proximity card, or a magnetic fob to the token-based authentication device. The method further includes transmitting a notification alert, e.g., an alarm signal, to a monitoring station upon authentication of the person as a authorized rapid responder, and unlocking the vault of the response station upon authentication to allow the authenticated authorized responder to access the vault compartment and the responder tool kit within the vault. The method continues with the authorized responder opening the vault to access the vault compartment, transmit incursion information to the monitoring station via the response station, and retrieve the responder tool kit including a ballistic vest and a defense device from the vault compartment, such that the rapid responder can initiate a response to the attacker.

A method of qualifying and authorizing rapid responders for a premises is provided herein and includes vetting an application of a responder applicant, wherein vetting the application includes performing a background check on the responder applicant. The method further includes training the responder applicant using a rapid response curriculum, testing the responder applicant using performance testing including simulated response scenarios, and qualifying the responder applicant as a qualified responder upon successful completion of vetting, training and testing. The method further includes classifying the rapid responder as one of an authorized responder or an unauthorized responder in an enrolled user database maintained for the premises, and providing the biodata and related authentication data for each of the rapid responders, including the classification of each rapid responder as authorized or unauthorized, to the controller of each response station on the premises.

Advantageously, by ensuring notification of an incursion at a premises is given to emergency services ("notification time") using the rapid response method and system provided herein, and by reducing the amount of time until initiation of a defensive response to the attacker ("response time") by a trained, qualified and authorized rapid responder using the rapid response method and system provided herein, the amount of damage which may be imposed by an attacker on premises inhabitants and/or on the premises during an incursion can be reduced.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 7 is a schematic illustration of a front view of the cage assembly;

FIG. 8 is a schematic illustration of a side view of the cage assembly;

FIG. 9 is a schematic illustration of a front view of the response station including the cage assembly installed to the vault;

FIG. 10 is a schematic illustration of section 7-7 of the response station of FIG. 9;

DETAILED DESCRIPTION

Figure 1:
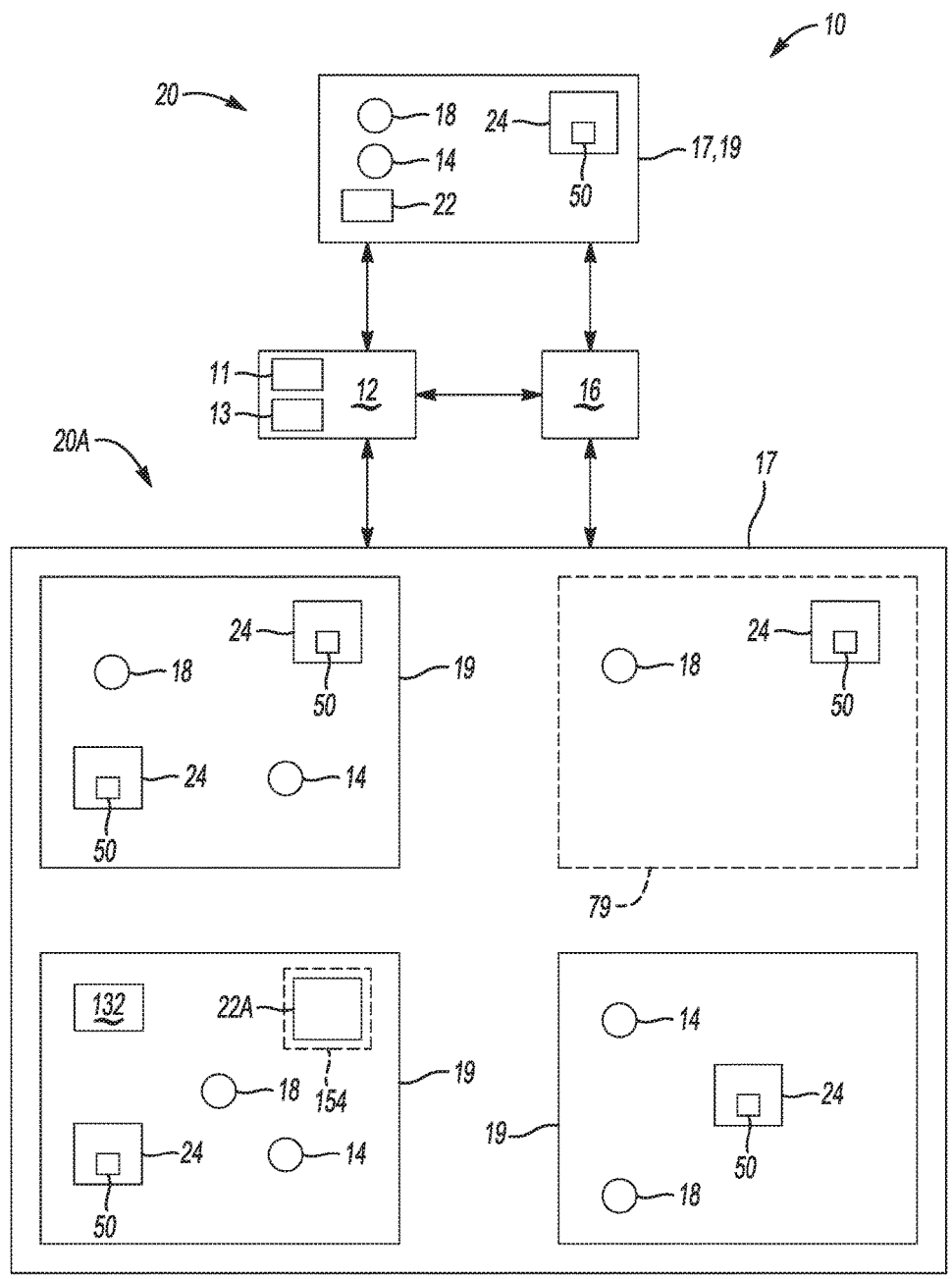
FIG. 1 is a schematic illustration of a rapid response system installed on at least one premises and including at least one response station.
Figure 3:
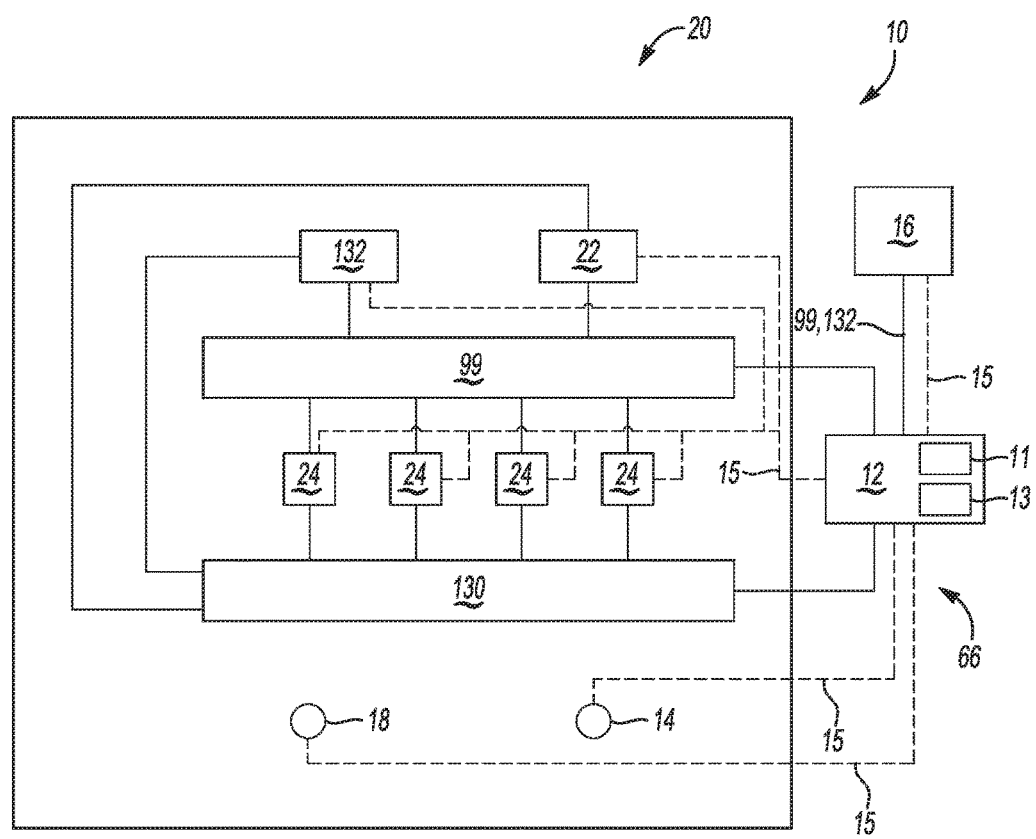
FIG. 3 is a schematic illustration of a communication system of the rapid response system.

Referring to the drawings in which like elements are identified with identical numerals throughout, FIGS. 1 and 3 show a rapid response system (RRS) generally indicated at 10. The RRS 10 includes a RRS monitoring station 12 which is located external to a premises 20 in which the RRS system 10 is to be operated, and further includes an RRS facility administrator station 22 and one or more RRS response stations 24 which are located on the premises 20 to which the RRS 10 is being installed. By ensuring notification of an incursion occurring at a premises 20 is made at an earliest possible time ("notification time") to emergency service providers 16 and by reducing the amount of time ("response time") until a rapid responder 14 can initiate a defensive response to the attacker, the amount of damage, including harm to inhabitants 18 of the premises 20 and/or property damage to the buildings 19 and/or exterior areas 79 of the premises 20 which may be imposed by an attacker during an incursion can be reduced. An incursion, as that term is used herein, refers to an attack on a premises 20, where the attack and/or incursion may also be referred to herein as a triggering event. A premises, as that term is used herein, can refer to a combination of one or more of a facility, a property, a building, an institution, and/or any of these including the grounds or property upon which the facility, building, etc. is located, and may be bounded for reference by a perimeter 17, as shown in FIG. 1. As shown in FIG. 1, a premises 20 can consist of a single building 19, where the building 19 defines the perimeter 17 of the premises 20 into which the RRS 10 is installed. In this example, the premises 20 can be limited to an individual building 19 such as a private home, a factory, a store, etc. For example, where the premises 20 is an individual building 19 such as a private home, the premises 20 can have a few as one inhabitant 18, where the one inhabitant 18 can be trained and authorized as a rapid responder 14 for the premises 20. The premises 20 can have a plurality of response stations 24 or may have as few as one response station 24 including a vault 30, and a facility administrator station 22.

FIG. 1 shows a second example of a premises indicated at 20A, where the premises 20A is bounded by a perimeter 17 and includes a plurality of buildings 19 and an exterior area 79 which may be, for example, a parking area such as a parking lot or parking garages. In the example of a premises 20A, the premises 20A can include one facility administrator station 22A supporting multiple buildings 19, multiple response stations 24, and multiple rapid responders 14 of the premises 20A. All or a portion of the facility administrator station 22A can be secured by a security mechanism 154. In a non-limiting example, the facility administrator station 22A can be a located in a secured room or enclosure, and the security mechanism 154 can be a locking system securing the room or enclosure. The security mechanism 154 can include a biometric authentication device, a passcode based authentication device, and/or token based authentication device to limit access to the facility administrator station 22A to one or more authorized facility administrators having possession of the authentication factor(s) (biodata, token, passcode, etc.) required to authenticate to the security mechanism 154. In one example, a security mechanism 154 can be applied to individual components of the facility administrator station 22. For example, referring to FIG. 4, the administrator controller 102, which may be a personal computing device, may be secured by a biometric authentication mechanism such as a thumbprint reader or a multi-factor authentication scheme requiring a user identification and password entry to access the personal computing device 102 and/or enrolled user database 134. The examples provided herein are illustrative and non-limiting.

Figure 2:
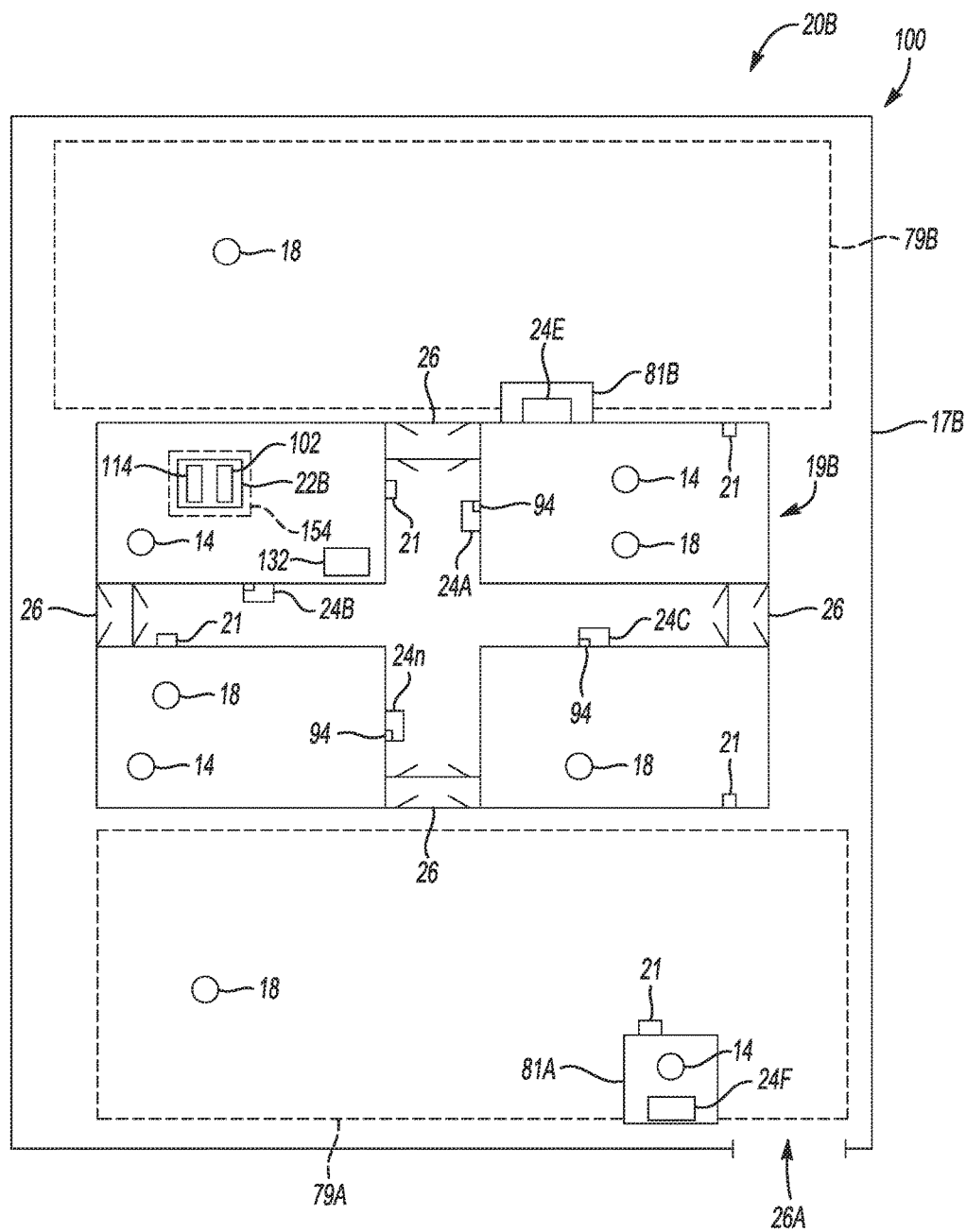
FIG. 2 is a schematic illustration of a premises with the rapid response system of FIG. 1 installed on the premises.

In one example response scenario 100 shown in FIG. 2, the triggering event can be an attack by an active shooter on a premises 20 which is an institutional premises indicated at 20B and which includes an institutional building 19B such as a school or hospital. The institutional premises 20B in the illustrative example shown in FIG. 2 is bounded by a perimeter 17B and includes a first exterior area 79A which can be a parking area, and a second exterior area 79B which can be an outdoor recreational area such as a playground. The response scenario 100 includes incursion of the facility premises 20B by the shooter/attacker (not shown), where the attacker is armed with one or more weapons capable of being deployed by the attacker to inflict bodily harm on inhabitants 18 of the premises 20B. The incursion/attack may be referred to herein as an active shooter event (ASE). The attacker's weapon(s) may include one or more firearms, handguns, long guns, assault weapons, or other weapons which may be operated (shot) by the attacker with the intent to inflict bodily harm on others which may include inhabitants 18 of the premises 20 and rapid responders 14 responding to the attacker/incursion. The attacker's weapon(s) may include other forms of weapons, such as knives, explosives, chemical weapons, etc., which may be deployed by the attacker with the intent to inflict bodily harm on others. It would be understood that the examples provided herein are for illustrative purposes and are not intended to be limiting.

A system 10 and method 200 (see FIG. 13) for rapidly responding to an incursion of a premises 20 by an attacker is provided herein. The system and method, referred to herein respectively as a "rapid response system" (RRS) 10 and a "rapid response method" 200 includes a secure means of providing notification of the occurrence of the incursion to emergency service providers 16 and/or to inhabitants 18 of the premises 20 including rapid responders 14 located on the premises 20, and further includes providing immediate access to a defensive responder tool kit 50 which is securely located on-premises in a response station 24 to a rapid responder 14 who is present on the premises 20 at the time the incursion is initiated. The term "rapid responder" as used herein and as will be described in further detail, is an individual who is routinely on the premises 20, for example, an employee of an institution located on the premises 20, who has been trained and qualified to respond to an incursion by accessing an on-premises response station 24 via an access mechanism 40, by providing notification of the incursion to emergency services 16 and to inhabitants 18 of the premises 20 via a communication module 72 of the response station 24 which is in communication with a monitoring station 12, to access a defensive responder tool kit 50 secured in a vault 30 of the response station 24, and to deploy the defensive responder tool kit 50 to initiate a defensive action against the attacker and/or to otherwise respond to the incursion, where response to the incursion may also include providing emergency medical treatment to victims of the attacker.

A "rapid responder," is distinguished from an "emergency responder," as those terms are used herein. A "rapid responder" is a routine inhabitant 18 of the premises, such as an employee of an institution located on the premises 20, who has been specially trained and qualified in the use of the "rapid response system" (RRS) 10 described herein, including use of the access mechanism 40, communication module 72, and responder tool kit 50. A "rapid responder" may also be referred to herein as a "qualified responder." Each rapid responder is further classified as one of an "authorized" rapid responder or an "unauthorized" rapid responder. An authorized rapid responder can be referred to herein as an "authorized responder." In contrast, an "emergency responder" is a responder who is located off-premises, e.g., who is not a routine inhabitant of the premises 20, and who travels to the premises 20 in response to an alarm or other notification that an incursion or triggering event has occurred. By way of example, "emergency responders" would include members of "emergency service providers" 16 such as police, firefighters, emergency medical services (EMS), military, special weapons and tactics (SWAT) teams, or other security personnel who would not typically located on the premises 20 in the absence of an incursion. The term "rapid response" refers to a response using the rapid response system 10 and/or the rapid response method 200 described herein, wherein the term "rapid" is defined as occurring more quickly, e.g., in a shorter elapsed time, than the time which would have been elapsed to provide notification of the triggering event to emergency service providers 16 and/or to provide warning to premises inhabitants 18 in the absence of the rapid response system 10 and/or method 200 described herein, and/or to initiate a defensive response to the attacker in the absence of the rapid response system 10 and/or method 200 described herein. Alternatively, the term "rapid response" refers to a response having a notification time and/or response time which is less than (quicker than) the average or historic notification time and/or response time for known comparable incursions, where a "comparable incursion" is a similar incursion occurring on a similarly configured premises 20 by a similarly armed attacker.

Rapid Response System (RRS) Overview

Figure 4:
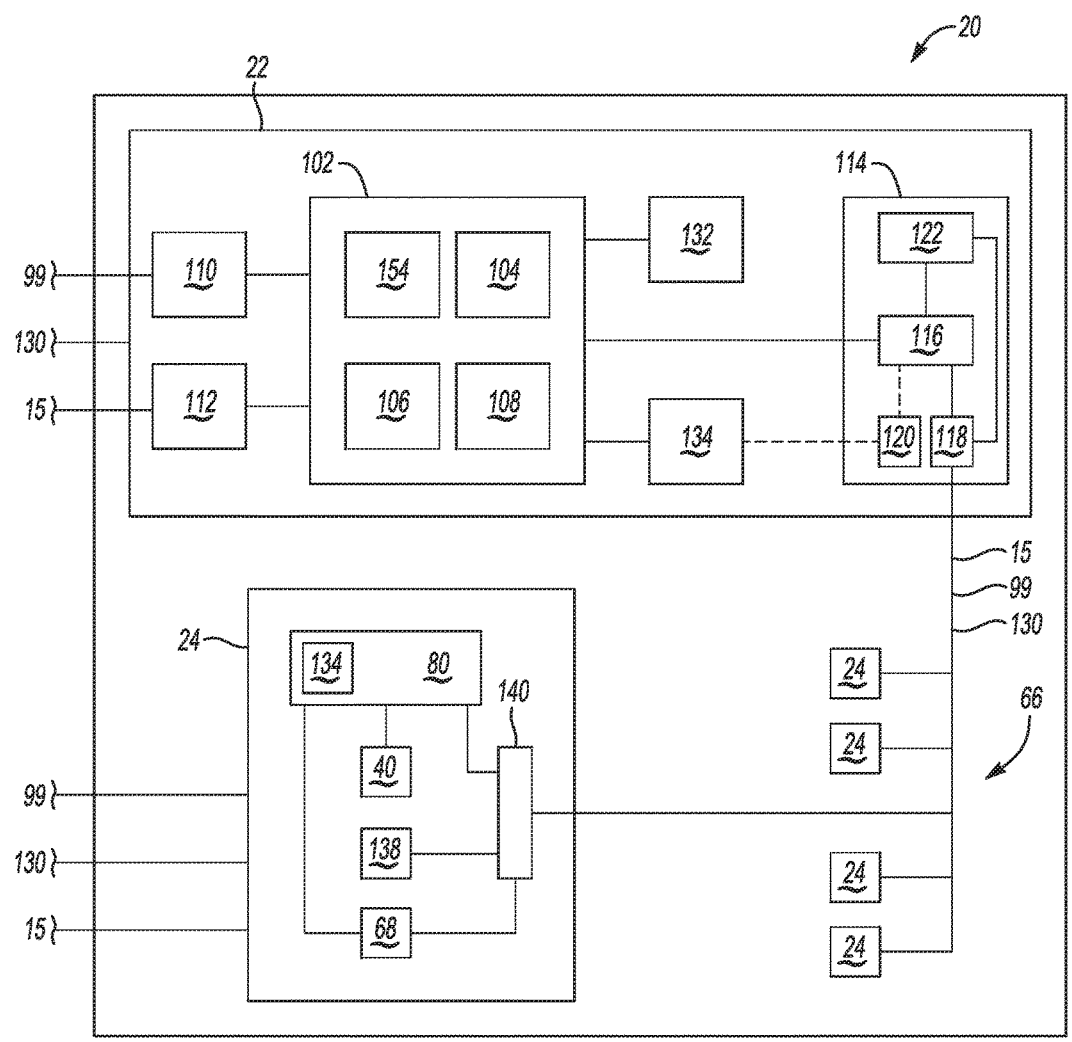
FIG. 4 is a schematic illustration of the communication system of the rapid response system.

Referring to the drawings in which like elements are identified with identical numerals throughout, FIGS. 1 and 3 show a rapid response system (RRS) generally indicated at 10. FIGS. 2 and 4 show a premises generally indicated at 20 to which the RRS 10 has been installed. The RRS 10 includes a RRS monitoring station 12 which is located external to the premises 20 in which the RRS 10 is to be operated, and further includes an RRS facility administrator station 22 and one or more RRS response stations 24 which are located on the premises 20 to which the RRS 10 is being installed. The RRS 10 further includes one or more rapid responders 14 and at least one RRS facility administrator to operate the facility administrator station 22. The RRS facility administrator may also be trained and qualified as a rapid responder 14. The monitoring station 12 may be operated by a centralized organization operating the RRS monitoring station 12 in communication with one or more premises 20 to which an RRS 10 has been installed, as shown in FIG. 1. The centralized organization operating the monitoring station 12, in a non-limiting example, can be the same organization which is responsible to install the RRS 10 into each premises 20, which may include configuring and installing an RRS facility administrator station 22 and one or more RRS response stations 24 on each premises 20, and to train a group of rapid responders 14 for each premises 20. The centralized organization may provide additional services to each RRS installed premises 20, such as providing installation and maintenance services to the installed RRS 10 including maintenance of one or more of the response stations 24, facility administrator stations 22 and the communication networks 66 connecting the response stations 24, administrator stations 22 and the monitoring station 12. The monitoring station 12 and the facility administrator station 22 are in communication with each of the RRS response stations 24. Operation of the RRS 10 includes training and qualification of one or more rapid responders 14. In one example, a sufficient number of rapid responders 14 are trained, qualified, and authorized such that at least one authorized rapid responder 14 is present on the premises 20 during operation of the RRS 10, where operation of the RRS 10 includes monitoring and response activities. The centralized organization can provide a monitoring service for monitoring the qualification and authorization status of each of the rapid responders 14 enrolled in the enrolled user database 134, as further described related to flowchart 300 shown in FIG. 14. In one example, the response stations 24 of the RRS 10 can be in communication with a legacy security system 132 of the premises 20, and the legacy security system 132 can be adapted to provide some of the functions described herein of the monitoring station 12.

A premises 20 may be referred to herein and in the drawings as a "facility," such that the terms premises and facility can be considered interchangeable within this description and the accompanying drawings for the purpose of describing a premises 20 to which the RRS 10 has been installed. The term "premises," or equivalently, "facility," is intended, as used herein, to refer to a structure such as a building 19 or group of buildings 19, and/or an area of land ("premises grounds") that may or may not include a structure or an exterior area 79 such as a parking, recreational or other outdoor space, and/or a movable structure not associated with premises grounds, such as a boat or plane, which is from time to time inhabited by inhabitants 18, and for which defense against an intrusion by an attacker (not shown) may be desired. The premises 20 may be, by way of example, a building 19 or group of buildings 19, a facility, or an institution, and may include property or exterior grounds 79 surrounding the building(s), facility, institution, etc. By way of non-limiting example, and illustrative of the broad interpretation to be given to the terms "premises" and "facility" as used herein, the premises 20 may be an individual school, an multi-building educational institution such as a university campus, a health care facility such as a clinic, pharmacy, hospital or medical campus, an office, office building, or office complex, a government or municipal institution such as a government administrative building, court house or jail, a retail facility such as a store or shopping mall, a factory or manufacturing complex, a hotel, retirement home, apartment complex or other residential facility or complex, a private home or residence, an indoor or outdoor entertainment complex such as a theater, amusement park, an arcade, an indoor or outdoor sports complex such as an arena or sports park, a transportation hub such as an airport, bus depot or train station, a movable structure such as an airplane, train, boat or cruise ship, etc. Installation of response stations 24 on the premises is not limited to installation of the response stations 24 within buildings 19 on the premises 20. For example, as shown in FIGS. 1 and 2, one or more response stations 24 may be located in parking lots, courtyards, perimeter grounds, recreational areas, or other non-enclosed areas within the premises 20. In the illustrative example of a school premises 20B shown in FIG. 2, response stations 24A, 24B, 24C and 24D are located in each of the main hallways of the school building 19B. Additionally, a response station 24E is located on the exterior playground area 79B and is enclosed in a station enclosure 81B to protect the response station 24E from the outside environment and/or to limit access to the response station 24E to authorized rapid responders 18. For example, the station enclosure 81B may be secured using an authentication device such as an authentication device 44, which requires input of a passcode and/or presentation of an authentication token such as a magnetic card or fob to access the station enclosure 81B, where the passcode and/or authentication token is possessed by the authorized rapid responders 18 on the premises 20B. As shown in FIG. 2, another response station 24F can be located proximate to a perimeter entrance 26A to the premises 20B. In the example shown, the response station 24F is located in a station enclosure 81A which is configured as a guard station including a guard qualified as a rapid responder 14.

The rapid response system 10 may be installed as a stand-alone system on the premises 20 and administered via a facility administration station 22B, in the illustrative example, where each of the response stations 24 is in communication with the monitoring station 12. In another example, the rapid response system 10 may be integrated with an existing or legacy security system 132 of the premises 20, such that features of the rapid response system 10 and the legacy system 132 of the premises 20 can be used together. For example, on-premises surveillance cameras 138, door-locking systems, warning sirens, shot detector sensing devices 21, etc. of a legacy system 132 previously installed on premises 20 may be integrated into and/or used in conjunction with the rapid response system 10.

As further described herein, it would be understood that the rapid response system 10 is configured to be operational at all times, such that, in the event the premises and/or building power supply is unavailable and/or the premises and/or building network is not functioning, the rapid response system 10 would continue to be operational for at least a predetermined period of time. In one example, the response stations 24 each include an uninterruptible power source (UPS) 68 which is electrically connected to the premises power supply or other external power source 92, such that the station UPS 68 is continuously maintained in a charged state when the external power source 92 is available, and continues to provide power to electrically powered components of the response station 24 including the controller 80 and a power pack 45 (see FIG. 12) of the responder tool kit 50, after interruption of the external power source 92. In one example, the station UPS 68 is configured to provide power for at least four hours and preferably at least eight hours after interruption of the external power source 92. In the example shown in FIG. 4, the facility administrator station 22 includes a include an uninterruptible power source (UPS) 122 which is electrically connected to the premises power supply or other external power source 92, such that the administrator UPS 122 is continuously maintained in a charged state when the external power source 92 is available, and continues to provide power to electrically powered components of the facility administrator station 22 including a wireless router 116 and Ethernet switch 188 connecting the vault stations 24 (see FIG. 4) after interruption of the external power source 92. In one example, the administrator UPS 122 is configured to provide power for at least four hours and preferably at least eight hours after interruption of the external power source 92. Various features of the RSS 10 are included in the RSS 10 to ensure the operational status of the system 10 including the response stations 24 is maintained continuously and/or for an extended period of time after interruption of the external power source 92 to the premises 20 and/or after interruption of a communication system such as a cellular network 15 and/or public telephone network system (PTNS) 130 to the premises 20. Examples of features to ensure continuing operational status of the RSS 10 include the use of multiple uninterruptible power supply units 68, 122 and power packs 45 to provide electrical power respectively to the response stations 24, the administrator station 22 and the responder tool kits 50 in the event of interruption of the external power source 92 to the premises 20, the use of a redundant communication network 66 (see FIGS. 3, 4, 5 and 11) including two or more of a cellular-based network 15, a radio-based network including two-way radios 124, a cable-based (WiFi/Ethernet/Broadband) network 99, and a public telephone network system (PTNS) 130, the use of redundant communication devices on the responder tool kit 50 (see FIG. 11) including two or more of a two-way radio 124, a cellular phone (shown as an additional tool kit element 47), a body worn surveillance camera 138, and a real time location (RTLS) pendant (shown as an additional tool kit element 47), the inclusion of a failsafe access mechanism 156 (see FIG. 5) to access the vault compartment 46 of the vault 50, etc.

FIGS. 1 and 2 show premises inhabitants 18 which may include persons which are routinely on the premises 20, for example, employees and/or residents of the premises 20, and may also include persons which are transient to the premises 20, for example, visitors, clients, customers, suppliers, service people, etc., which are temporarily on the premises 20. In the example shown, the rapid responders 14, as described previously and further described in detail herein, are inhabitants 18 of the premises 20 which have been trained and qualified to use the RRS 10 to respond to an incursion of the premises 20. Each of the rapid responders 14 are enrolled in an enrolled user database 134. Information for each rapid responder 14 is collected and associated with the respective rapid responder 14, including but not limited to biodata collected from the rapid responder 14 using a bioscanner 110. In one example, the bioscanner 110 is an iris scanner for collecting iris scan data from each rapid responder 14. Other biodata collected from each rapid responder 14 and included in the enrolled user database 134 can include descriptive data such as height, weight, hair and eye color, and other identifying information for visual identification of the rapid responder 14 by emergency service providers 16 and/or by premises surveillance cameras 138, and distance of the rapid responder's iris centerline from the ground for adjustment of the biometric authentication device 42 of the access mechanism 40 by a adjusting mechanism 35 during an authentication sequence.

As shown in FIGS. 1, 2, 3, and 4, the RRS 10 includes at least one response station 24, and typically, more than one response stations 24A, 24B, 24C . . . 24n, referred to collectively as response stations 24, which are located in predetermined locations in the premises 20. The predetermined locations of the response stations 24 may be, as shown in FIG. 2, adjacent or proximate to access points 26 of the premises 20 such as entrances 26 which may be more vulnerable to access by an attacker. The response stations 24 are preferably located in the premises 20 for ready access by a rapid responder 14 in the event of an intrusion. As described in further detail herein, the response stations 24 may be positioned within the premises 20 such that each response station 24 is securely installed to the building structure 57 of a building 19 of the premises 20 to prevent tampering with the response station 24 and to provide secure connection of the response station 24 to a power source 92 and communication network 66. (See FIG. 5). In the example shown in FIG. 5, the vault 50 is securely attached to a building wall 57C and a building floor 57A of the building 19 using vault retainers 59, which may be, for example, lag bolts or other fasteners of sufficient strength to prevent separation of the vault from the building structure 57.

Figure 5:
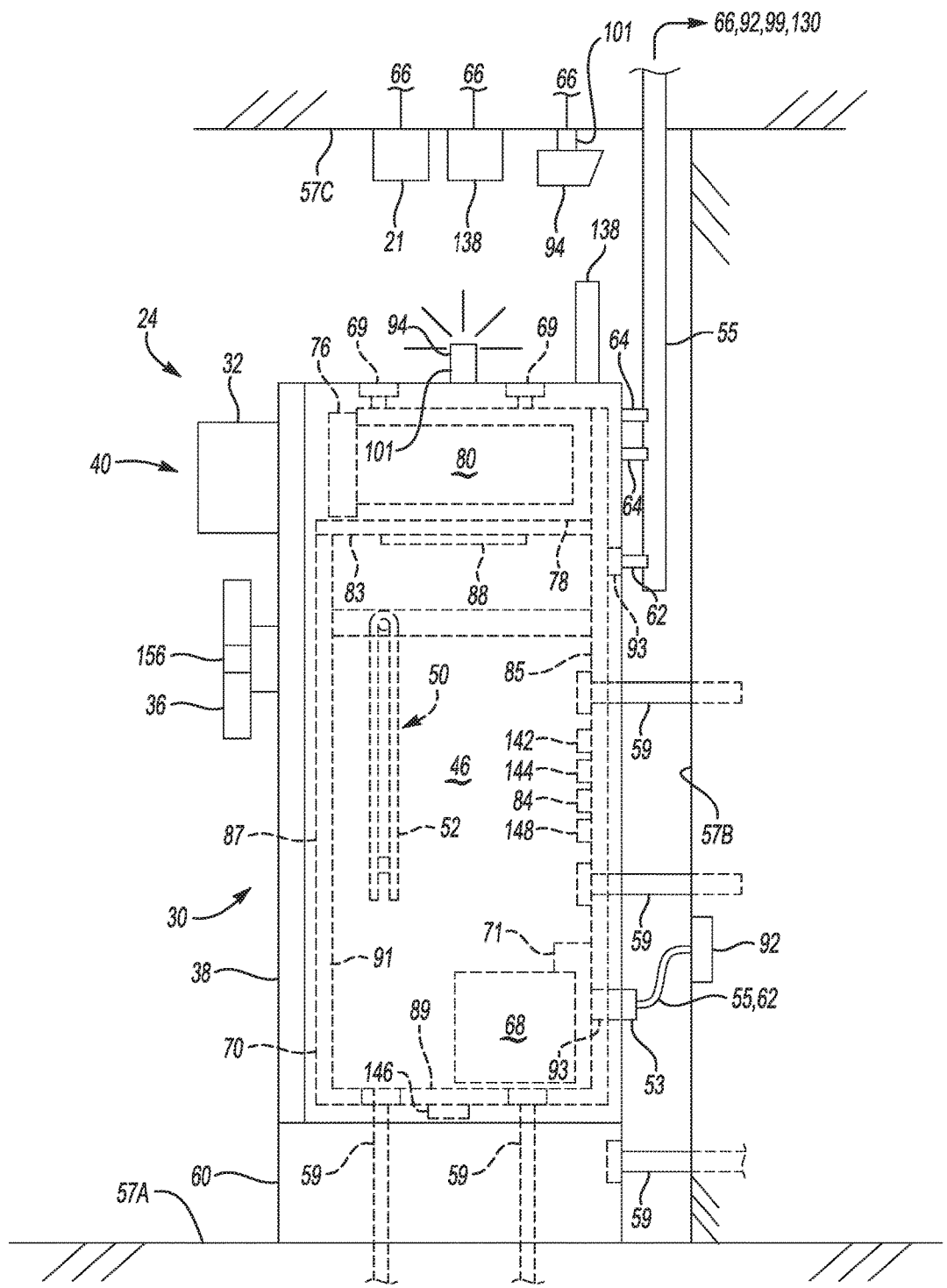
FIG. 5 is a schematic illustration of a side view of a response station of the rapid response system, including a cage assembly installed to a vault.
Figure 6:
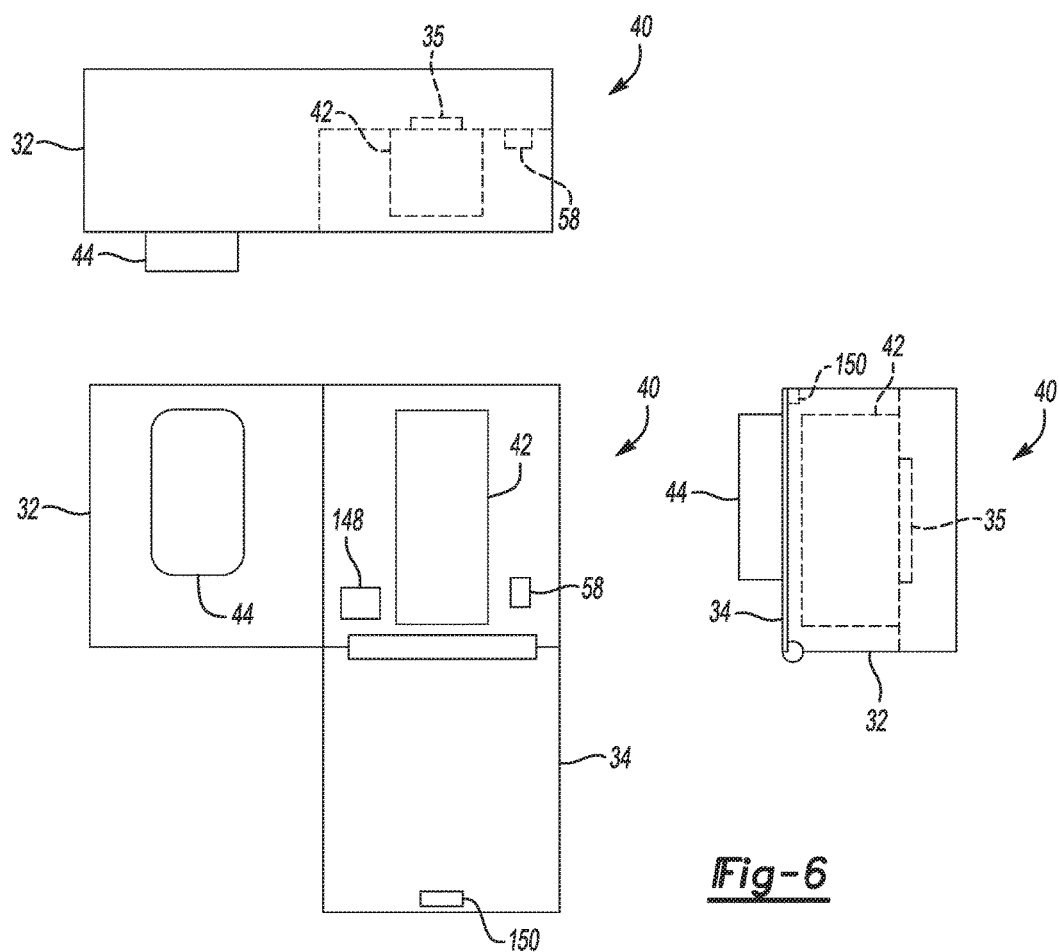
FIG. 6 is a schematic illustration of front, top and side views of a station access mechanism of the response station.

As shown in FIGS. 5, 9 and 10, each response station 24 includes a vault 30 including a vault compartment 46 enclosed by a vault door 38. Each response station 24 includes an alarm controller 80 which in an installed condition is positioned in the vault compartment 46. In an illustrative example, a cage assembly 70 including the alarm controller 80 is installed in the vault compartment 46. The alarm controller 80 is also referred to herein as a controller 80. The vault door 38 is lockable to the vault 30 via a vault latching mechanism 96. The vault latching mechanism 96 is unlocked using a station access mechanism 40 shown in FIG. 6, which is located external to the vault and in communication with the controller 80 installed in the vault compartment 46. In the example shown in FIGS. 5, 9 and 10, the access mechanism 40 is mounted to the vault door 38. The station access mechanism 40 is configured to unlock the vault latching mechanism 96 upon successful authentication of a person external to the vault 30 using a biometric authentication device 42. In the example shown, the biometric authentication device 42 includes a bioscanner to collect biodata (a bio-signature or biometric authentication factor) from the person external to the vault 30. In a preferred example, the biometric authentication device 42 is an iris scanner for collecting iris biodata, for example, an iris image and/or a retinal pattern from an eye or eyes of the person external to the vault 30, for comparison with the biodata in the enrolled user database 134, where the enrolled user database 134 is stored to the controller 80. The controller 80, upon determining a match between the biodata collected from the person external to the vault and the biodata of at least one authorized rapid responder 14 stored in the enrolled user database 134, authenticates the person external to the vault as an authorized rapid responder 14 and unlocks the vault 30 to allow the authorized rapid responder 14 to access the vault compartment 46 and to the responder tool kit 50 in the vault compartment 46. In the example shown in FIGS. 6 and 10, the access mechanism 40 is configured as a two factor authentication system, requiring a first biometric authentication factor to be provided to the biometric authentication device 42, and a second token authentication factor to be provided to the token-based authentication device 44, for the access mechanism 40 to determine whether the person can be authenticated as an authorized rapid responder 14. In an illustrative example, in response to an incursion, and referring to the example response timeline 28 and the example flowchart 200 shown in FIG. 13, at step 205 an authorized rapid responder 14 moves to the nearest response station 24 and the rapid responder 14 presents an authentication token, such as an encoded magnetic card or encoded proximity card to the enclosure authentication device 44, which is a token-based authentication device such as a magnetic card reader or proximity card reader in the present example, to unlock an enclosure door 34 (see FIG. 6) to access the biometric authentication device 42 enclosed in an enclosure 32 of the station access mechanism 40. In the example shown in FIG. 6, the biometric authentication device 42 includes a bioscanner which is an iris scanner. The rapid responder 14 at step 210 provides a bio-signature (biodata) to the biometric authentication device 42, where in the illustrative example the biodata is the iris image and/or retinal pattern of the rapid responder 14 scanned by the bioscanner authentication device 42. The controller 80 at step 215 in the current example confirms the biodata (iris image and/or retinal pattern) of the rapid responder 14 as matching biodata of an authorized rapid responder 14 in the enrolled user database stored in the controller 80 and immediately initiates notification of the incursion by communicating an alarm signal at step 220 to the monitoring station 12. Also at step 215, and contemporaneous with communicating an alarm signal to the monitoring station 12, the controller 80 actuates the vault latching mechanism 96 to unlock the vault door 38, allowing the authorized rapid responder 14 to access the cage assembly 70 and responder tool kit 50 in the vault compartment 46 at step 235.

As shown in FIGS. 5, 9 and 10, the responder tool kit is generally indicated at 50 and is removable positioned in the vault compartment 46. In an illustrative example, the responder tool kit 50 is removably attached to the cage assembly 70 housed in the vault compartment 46 for ready access by the rapid responder 14. The rapid responder 14 at step 240 dons the responder tool kit 50, e.g., dons the vest 52, which may be adjusted by adjustable straps 43 to fit the vest 52 to the rapid responder 14. At step 245, communication is established between the rapid responder 14 and the monitoring station 12 using a communication module 72 included in the cage assembly 70. At step 225, the monitoring station 12 after confirming with the rapid responder 14 that a triggering event has occurred on the premises 20, contacts emergency services providers 16 to dispatch the emergency services providers 16 to the premises 20. At step 230, the monitoring station 12 establishes communication between the emergency services providers 16 and the rapid responder 14, via the monitoring station 12 and the communication module 72 of the cage assembly. Communication between the rapid responder 14 and other rapid responders 14 who have retrieved responder tool kits 50 can also be established using portable communication devices 124 included in the responder tool kits 50 which in one example are two-way radios tuned to a radio frequency predetermined for the premises 20. The portable communication device 124 can also be used to for communication between the rapid responder 14 and emergency service providers 16 who have access to the predetermined radio frequency for the premises 20. In one example, the monitoring service 12 may provide the predetermined radio frequency for the premises 20 to the emergency services providers 16 with other information related to the alarm notification and/or premises 20 for use in responding to the incursion event. The portable communication device 124 in the example shown includes a hands free input/output device 86, such as a lapel microphone, for hands-free communication by the rapid responder 14. The hands free input/output device 86 may be a wired device connected to the portable communication device 124 or may be wirelessly connected to the portable communication device 124, for example, using Bluetooth® or other wireless communication protocol. At step 250 the rapid responder 14 wearing the responder tool kit 50, initiates response to the triggering event, e.g., to the incursion.

Figure 11:
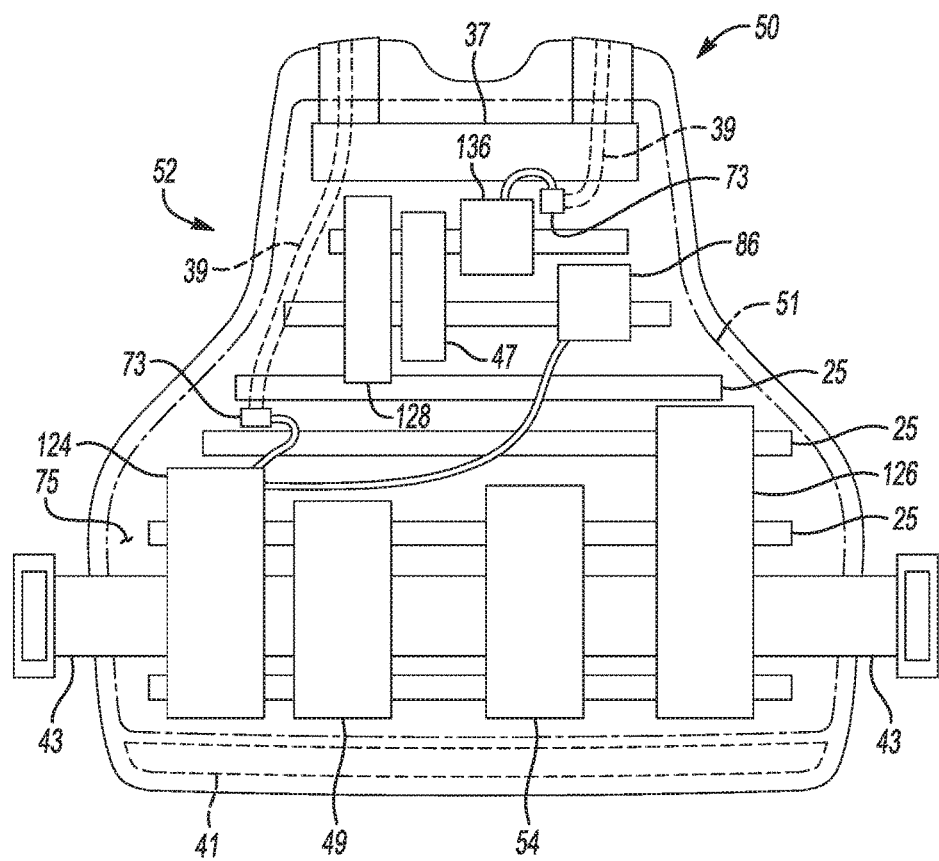
FIG. 11 is a schematic illustration of a front view of a responder tool kit including a vest.
Figure 12:
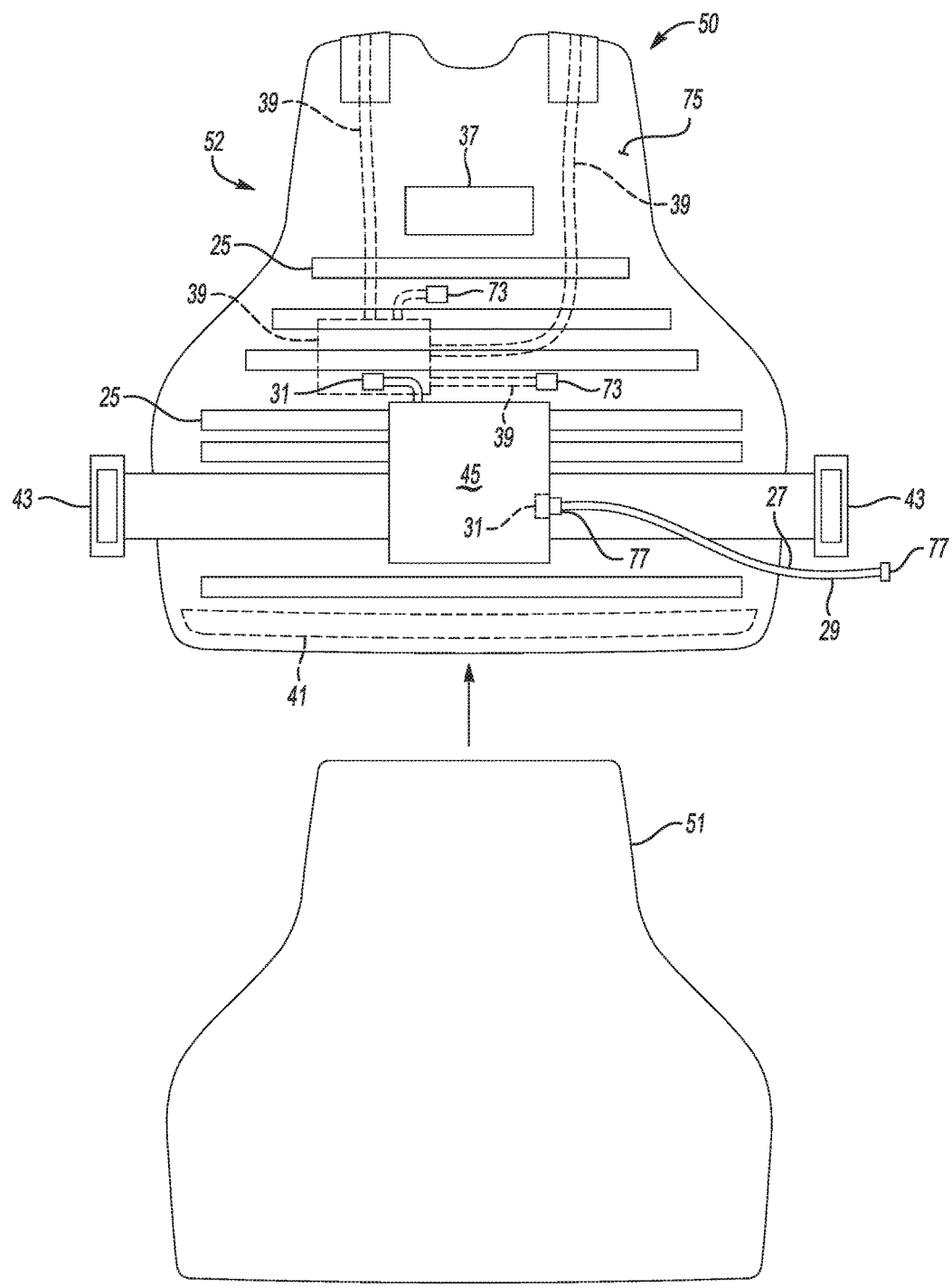
FIG. 12 is a schematic illustration of a rear view of a responder tool kit including vest having a ballistic insert.

As shown in FIGS. 11 and 12, the responder tool kit 50 includes a vest 52, at least one portable communication device 124, and at least one defense device 54. The vest 52 in the example shown is a ballistic vest, which may also be referred to or known as a bullet-resistant vest, a bullet-proof vest, and/or body armor, configured to absorb the impact from firearm-fired projectiles and shrapnel from explosive devices or explosions and to be resistance to stab and slash attacks from knives and similar close-quarter weapons. The vest 52 may be reinforced with ceramic or metal plates in the form of a ballistic insert 51 to provide additional protection from rifle rounds, for example. The ballistic insert 51 in the example shown in FIG. 12 is removable from the vest 52 via a re-closeable opening 41, such that the ballistic insert 51 and/or the vest 52 can be separately reused and/or different types of ballistic inserts 51 can be inserted to the vest 52 and used for different response scenarios. The defense device 54 is provided with the responder tool kit 50 for use by the rapid responder 14 to deter or impede the attacker, which may include use of the defense device 54 to disarm or immobilize the attacker. In the non-limiting example shown in FIG. 11, the defense device 54 is a firearm such as a handgun. As described further herein, the tool kit 50 may include one or more defense devices 54, including, for example, a firearm, bear or pepper spray, and/or a stunning device such as a stun gun, stun baton or TAZER®. At step 250, while responding to the incursion, the rapid responder 14 can continuously communicate via the hands free device 86 and/or the portable communication device 124 other rapid responders 14 and/or with the emergency service providers 16 to provide information regarding the incursion such that additional actions responsive to the incursion and attacker can be initiated by the monitoring station 12 and emergency service providers 16. At step 250, the rapid responder 14 takes responsive actions against the attacker, which may include actions to deter, impede, disarm and/or immobilize the attacker to prevent the imposition of harm or injury on the inhabitants 18 by the attacker, to warn and/or protect inhabitants 18 of the premises 20, and/or to provide emergency medical treatment to inhabitant victims of the attacker, for example, for bleeding, breathing and shock trauma. In the example response scenario illustrated by the timeline 28 and method 200 shown in FIG. 13, the total elapsed time (Tt) from detection of the triggering event, e.g., from detection of the incursion and/or attacker by a rapid responder 14, until notification of the incursion is made to the monitoring station 12 (3 seconds) and to emergency services 16 (35 seconds) and until the rapid responder has accessed the responder tool kit 50 (5-10 seconds) and is prepared to initiate a responsive action against the attacker (40 seconds) is less than one minute. Advantageously, by reducing the amount of total elapsed time to less than one minute until a rapid responder 14 can initiate a defensive response to the attacker, the amount of damage which may be imposed by an attacker during an incursion may be substantially reduced. Referring to the timeline 28 shown in FIG. 13, the event time Et is the estimated time in seconds to complete the event represented by that step of the method 200. The total elapsed time (total time) Tt of a step of the method 200 is the cumulative elapsed time from beginning the method 200 to the completion of that step of the method 200. For example, the event time Et of step 205 is estimated to be 1 second (1 s), and the event time Et of step 210 is estimated to be 2 seconds (2 s) such that the total time Tt to complete steps 205 and 210 is 3 seconds (3 s). It would be understood that the actual elapsed time to complete the events illustrated by the timeline 28 shown in FIG. 13 may vary from the estimated times shown in FIG. 13, for example, due to actual distance between a rapid responder 14 and a response station 24 at the time an incursion is detected by the rapid responder 14, the physical condition of the rapid responder 14, the location of the attacker relative to the response station 24 and the rapid responder 14, etc., however it would be appreciated that the rapid notification time and rapid response time which is achievable by use of the RRS 10 is considerably less than, respectively, a notification time using traditional notification methods such as a telephone call to 911/emergency services 16, and a response time using traditional response methods such as awaiting arrival of emergency service responders (police, fire) from a location external to the premises 20.

Optionally, as shown in FIGS. 2 and 5, the RSS 10 may include one or more shot detecting devices 21 located on the premises 20 and configured to detect a gunshot which has been fired. The shot detecting device 21 is in communication with at least one of the facility administrator, the monitoring station 12, and the rapid responders 14, such that upon detecting a gunshot has been fired, the shot detecting device 21 outputs a detection signal that a gunshot has been detected to at least one of the facility administrator, the monitoring station 12, and the authorized rapid responders 14, such that an alert can be output at least to rapid responders 14 on the premises 20 that a gunshot has been detected, such that one or more of the rapid responders 14 can initiate a response as described by the timeline 28 and the flowchart 200 of FIG. 13. The monitoring station 12 upon receiving an alert from the shot detector that a gunshot has been detected, can contact emergency service providers 16 for dispatch to the premises 20, and can communicate the alert to one or more of the facility administrator, the rapid responders 14, and the premises inhabitants 18, for example, via email, text, SMS or other similar communication methods. Detection of a gunshot by a shot detecting device 21 may accelerate initiation of notification and response actions taken by one of more rapid responders 14, to decrease notification and/or response time during an active shooter event (incursion by a shooter attacker).

Monitoring Station

Figure 13:
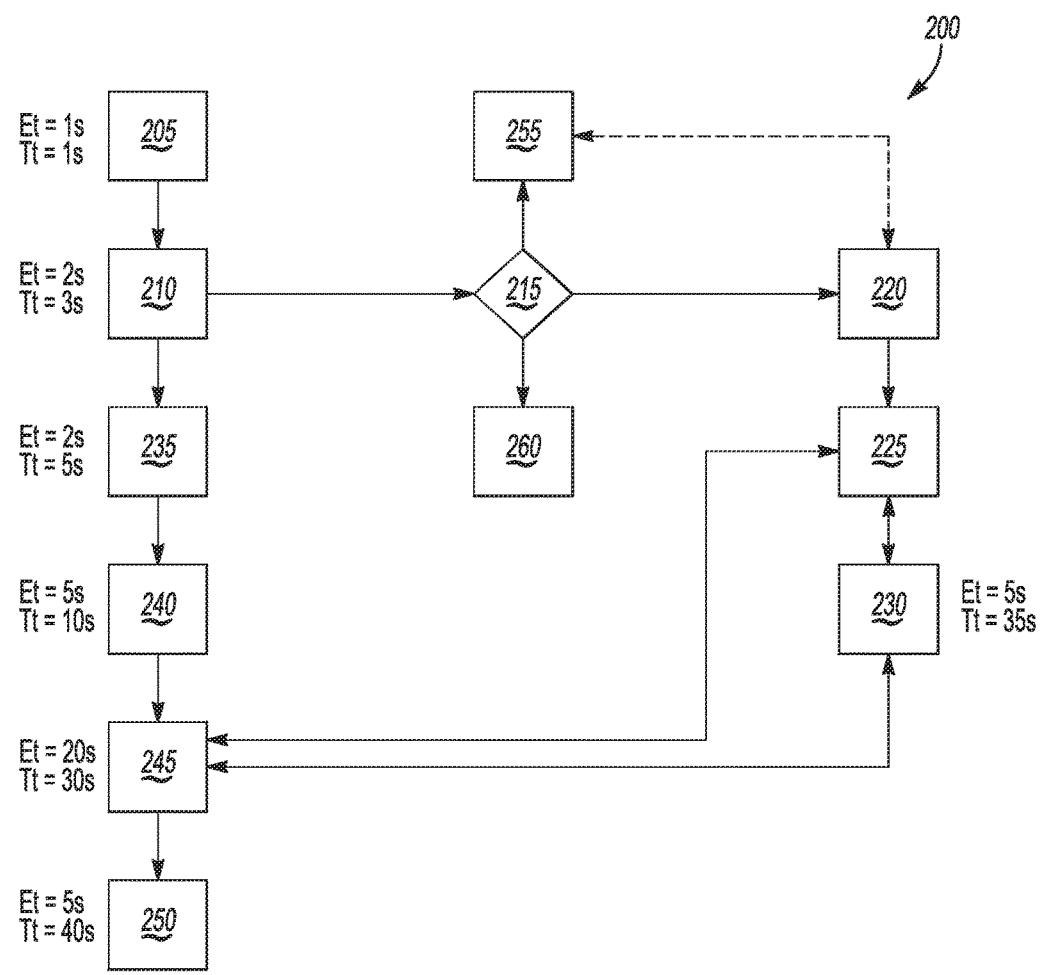
FIG. 13 is a schematic illustration of a method for responding to a triggering event using the rapid response system.

Referring again to FIGS. 1, 3 and 13, the rapid response system (RRS) 10 includes the monitoring station 12 which is located external to the one or more premises 20 to which the RRS 10 has been installed. The monitoring station 12 is configured to be in communication with each premises 20 to which the RRS 10 has been installed, such that the monitoring station 12 monitors a plurality of premises 20 and is in communication with each of the response stations 24 installed to each respective premises 20. As shown in FIG. 3, RSS 10 can be configured such that the monitoring station 12 can use a redundant communication network 66 including two or more of a cellular-based network 15, a cable-based (WiFi/Ethernet/Broadband) network 99, and a public telephone network system (PTNS) 130, for communication with the facility administrator, and/or the response stations 24, to ensure continuity of communication during an incursion event. The monitoring station 12 can access and/or distribute data and information transmitted from one or more of the portable communication devices on the responder tool kit 50, which can include by way of example video surveillance data uploaded from a body worn surveillance camera 138, and/or location data transmitted from a real time location (RTLS) pendant 47 and which can be made available to, for example, emergency service providers 16 to assist in the planning and coordination of response actions taken by the rapid responders 14 and the emergency service providers 16. In one example, each portable communication device transmitting data from the responder tool kit 50 to a network, for example, each body camera 138 and each RTLS pendant 47, can be identified with a dedicated IP address, such that the monitoring station 12 and/or emergency service providers 16 can utilize the dedicated IP address to access, retrieve, distribute and/or otherwise disseminate data being transmitted from the respective portable communication device. The monitoring station 12 includes a computer and/or processor 11, and a memory 13, and further includes all software, hardware, algorithms, connections, sensors, etc., necessary to perform the functions of the monitoring station 12 as described herein and identified in the drawings and figures. The monitoring station 12 actively monitors the responder response stations 24 in each of the installed premises 20, receives alarm signals generated from the responder response stations 24, and vets each of the received alarm calls, as shown in flowchart 200 at step 225 shown in FIG. 13. When it is determined from the alarm vetting that a threat, such as a duress event, active shooter event, tampering or intrusion event or other incursion event, is actual or highly probable, the monitoring station contacts the emergency service providers 16. When a threat or high probability of a threat is determined, the monitoring station 12 initiates and coordinates communication in response to a threat as shown in FIG. 13 and schematically in FIGS. 1 and 3, which includes contacting emergency service providers 16, and can further include alerting one or more of the facility administrator and rapid responders 14 of the facility/ premises 20 from which an alarm is initiated, and at least some of the premises inhabitants 18, for example, employees of the premises 20 such as school teachers in the school premises 20B shown in FIG. 2, and which may include providing additional information to the facility administrator, the rapid responders 14, and/or to emergency services 16 which is specific to the incursion, such as status information, floor plan information, the location of the response station 24 from which the alarm was generated, information such as IP addresses to access video surveillance data from surveillance cameras 138 located on the premises 20 and/or body cameras 136 worn by rapid responders 14 located in the premises 20, designated radio frequencies to communicate via the portable communication devices (radios) 124, etc. Information including alert information sent to the facility administrator, rapid responders 14, and/or premises inhabitants 18 can be send by the monitoring station 12 using any suitable means including telephone, email, and/or messaging services such as text messages, instant messaging, short message services (SMS), etc. As previously described, the RRS 10 can be installed on a premises 20 such that a legacy security system 132 already installed in the premises 20 can be integrated into the RRS 10. In one example, a monitoring station 12 of the legacy security system 132 may perform the functions of the monitoring station 12 described herein, including vetting alarm signals generated by a response station 24 prior to contacting emergency service providers 16.

Facility Administrator Station

The RRS 10 includes a facility administrator station 22 installed in each premises 20 to which the RRS 10 is installed. In the illustrative example shown, the facility administrator station 22 in a respective premises 20 is in communication with each of the response stations 24 located in the respective premises 20, for example, such that the facility administrator station 22 can communicate with each controller 80 to provide updated data and/or programming to each controller 80. As described related to method 300, each time an enrolled user data base 134 is updated to include new and/or revised data related to one or more rapid responders 14, the updated enrolled user data base 134 is sent by the facility administrator station 22 to each controller 80. Programming updates, diagnostic information, etc., may be communicated between the controller 80 and the facility administrator station 22. The illustrative example is non-limiting, and it would be understood that each controller 80 can be independently accessed for initially downloading and updating the enrolled user database 134 on each controller 80, using, for example, a portable memory device such as a USB drive to port the enrolled user database 134 to the controller 80. The controller 80 can include a controller interface 76 which in an illustrative example includes a keyboard, through which diagnostic routines can be performed and/or programming updates to the controller 80 can be made. In one example, one or more of an administrator computer 102, the bioscanner 110 and/or the token generating device 112 can be directly connected to each of the controllers 80 of each response station 24 perform the functions described herein including updating the enrolled user database 134 in each of the controllers 80, without the use of the communication network 66.

The facility administrator station 22, as shown in FIGS. 1, 2, 3, and 4, includes a computing device 102, e.g., a server, an administrator computing device and/or processor 102, and includes all software, hardware, memory, algorithms, connections, sensors, etc., necessary to perform the functions of the facility administrator station 22 as described herein and identified in the drawings and figures. The administrator computing device 102 may be a portable computing device, such as a laptop, such that the portions of the facility administrator station 22 are movable during an incursion, for example, when needed to continue to secure or access data, such as information stored in the enrolled user database 134, IP addresses for the portable communication devices on the responder tool kits 50, etc. which may be stored on the administrator computing device 102. As shown in FIG. 4, the computing device 102 includes video management software 104, vault access software 106, and RRS alarm management software 108. Access to the administrator station 22 and/or the computing device 102 can be secured using a security mechanism 154, which may be, for example, a single factor or multifactor authentication mechanism to secure the room and/or enclosure in which the administrator station 22 is contained and/or to secure the computing device 102 and/or other elements of the administrator station 22.

The facility administrator station 22 for each respective premises 20 further includes a biometric scanner 110, which by way of non-limiting example may be an iris scanner, a retina scanner, a fingerprint scanner, etc., configured to receive biometric data (biodata) from a person to be enrolled in the enrolled user database 134, where the biometric data received from the person is stored as a bio-signature in the enrolled user database 134 which may be used to authenticate the person through the biometric authentication device 42 of the station access mechanism 40, as previously discussed. The terms biometric data, biodata and bio-signature are used interchangeably herein to refer to biometric data which is collected from a person for use in authenticating the identity of that person. In one example, the biometric scanner 110 may be an iris scanner which scans an image of one or both irises of a user and stores the iris image as a bio-signature of the user in the enrolled user database 134 for comparison with an iris image read by the biometric authentication device 42, which includes an iris scanner in the illustrative example. In one example, the biometric scanner 110 may be a retina scanner which scans a retinal pattern of one or both eyes of a user and stores the retinal pattern as a bio-signature of the user in the enrolled user database 134 for comparison with a retinal pattern read by the biometric authentication device 42. As previously described, an enrolled user may be a rapid responder 14, an RRS maintenance technician, an RRS facility administrator, an RRS trainer, or other person which may require access to the responder response stations 24 of the respective premises 20. A current status of each bio-signature (biodata) may be maintained in the enrolled user base 134. For example, the current status of a bio-signature may be "authorized bio-signature" indicating the bio-signature is a biometric characteristic (the biodata) of an authorized person, or "deauthorized bio-signature" indicating the bio-signature is a biometric characteristic (the biodata) of a deauthorized person, such that the vault access software 106 in communication with the enrolled user database 134 and the bio-scanner authentication device 42 can determine if an input to the bioscanner authentication device 42 is from an authorized person, in which event a vault latching mechanism 96 is released such that the vault door 38 can be opened to provide access to the vault 30, or if the input to the bioscanner authentication device 42 is a deauthorized bio-signature, in which case the vault 30 remains locked and a tampering signal can be generated by the controller of the vault station 24 and/or the facility administrator station 22 to the monitoring station 12, and additional actions taken as appropriate to investigate and/or respond to the potential tampering event.

The facility administrator station 22 for the respective premises 20 may include a token generating device 112 for generating an authentication token for use with the token-based authentication device 44 of the station access mechanism 40. In the present example, the token generating device 112 is configured as a proximity card generator 112 for producing individual proximity cards which may be issued to each of the enrolled and authorized persons. The identifying card data for each of the individual proximity cards is associated with the enrolled user who has been issued the individual proximity card in the enrolled user database 134 for comparison with identifying card data read by the token-based authentication device 44. A current status of each issued proximity card may be maintained in the enrolled user base 134. For example, the current status of an issued proximity card may be "issued-authorized," "issued-deauthorized," "lost-deauthorized," etc. such that the vault access software 106 in communication with the enrolled user database 134 and the token-based authentication device 44 can determine if an input to the token-based authentication device 44 is from an authorized proximity card (token), in which event the enclosure door 34 is released to provide access to the bioscanner authentication device 42, or if the input to the token-based authentication device 44 is from a deauthorized proximity card, in which event a tampering signal may be generated by the facility administrator station 22 to the monitoring station 12, and additional actions taken as appropriate to the potential tampering event.

The facility administrator station 22, as previously described, provides the enrolled user database 134 to the controller 80 of each response station 24 in the premises 20 administered by the facility administrator station 22, and provides an updated enrolled user database 134 to the controller 80 each time any data stored in the enrolled user database 134 is updated and/or revised, such that the enrolled user database 80 is updated in real time with updates made by the facility administrator station 22. As previously discussed, an updated enrolled user database 134 can be provided to each controller 80 from a portable memory device, by direct access to the controller 80 in the vault compartment 46, without using the communication network 66. The controller 80 stores the enrolled user database 134 to the controller 80 for use in determining whether biodata received via the biometric authentication device 42 of the access mechanism 40 in communication with that controller 80 is received from a person identified as an authorized person, such as an authorized rapid responder 14, in the enrolled user database 134. The enrolled user database 134 is updated each time a person is added or deleted from the enrolled user database 134 and each time a change in status of a person from one of authorized and de-authorized to the other of authorized and de-authorized occurs.

The facility administrator station 22 further includes an Ethernet enclosure 114, which encloses a wireless router 116. The wireless router 116 is firewall protected to prevent hacking into the router 116 and to secure the router 116. The Ethernet enclosure 114 further includes an Ethernet switch 118 in communication with an Ethernet switch 140 located in the vault compartment 46 in each of the response stations 24 located in the premises 20. The cage Ethernet switch 140 is in communication with the controller 80 of that cage assembly 70. The Ethernet enclosure 114 contains network attached storage (NAS) 120, upon which the enrolled user database 134 may be stored, and an uninterruptible power supply (UPS) 122 for powering the Ethernet switch 118 and the router 116 in the event of an interruption of power to the premises 20 from the external power source 92. The facility administrator computing device 102 can be connected to the UPS 122 such that in the event of power failure the UPS 122 can provide power to continue to operate the facility administrator station 22. The facility administrator station 22 is connected to each of the response stations 24 by the communication network 66, for example, via the cable-based network 99 (including Ethernet/WiFi/Broadband connections).

Responder Response Station Including Station Access Mechanism and Cage Assembly

Referring to FIGS. 5, 6, 7, 8, 9, and 10, and as previously described herein, each response station 24 includes a vault 30. In an illustrative example, a cage assembly 70, in an installed condition as shown in FIGS. 5, 9 and 10, is positioned within a vault compartment 34 of each respective vault 30. The cage assembly 70 in the illustrative example includes one or more of the controller 80, the communication module 72, the uninterruptible power source 68, a tool kit charging module 65, and electrical circuitry including power and/or communication cables 95 for connecting to one or more of the controller 80, the communication module 72, the uninterruptible power source 68, the tool kit charging module 65, an outlet box 71 mounted to the cage assembly 70, etc. For clarity of illustration, the detail of the electrical circuitry including power and/or communication cables 95 connecting the various components mounted to the cage 87 and/or cage assembly 70 are not shown in the figures but would be understood from the relational descriptions of the various components provided herein.

The cage assembly 70, in an non-limiting example, includes a cage structure 87, also referred to as a cage 87, to which the controller 80, the communication module 72, the tool kit charging module 65, and the electrical and communication circuitry are mounted, and can further include a light 88 for lighting the vault compartment 46 and a tool kit holder 61 for positioning and removable attachment of one or more responder tool kits 50. In one example, the tool kit holder 61 includes at least one pivoting arm 63 on which a responder tool kit 50 can be positioned for easy access and retrieval by a rapid responder 14 accessing the vault compartment 46. In one example, the cage assembly 70 can be preconfigured with one or more of a controller 80, communication module 72, tool kit charging module 65, electric circuitry, etc., mounted to the cage 87 prior to installation of the cage assembly 70 to the vault compartment 46. The preconfigured cage assembly 70 is advantaged by providing a consistent and predictable arrangement of the components in the vault compartment 46, where the response time of a rapid responder 14 in using and retrieving the components, including the communication module 72, responder tool kit 50, etc., during an incursion event can be minimized by presenting the components in a consistent and predictable arrangement on the cage assembly 70 as positioned in the vault compartment 46. The cage assembly 70 can include adjustment features 69 to adapt and/or fit the cage assembly 70 to various sizes of vault compartments 46 without having to modify the predictable arrangement of the components in the cage assembly 70. In the illustrative example described herein and shown in the figures, a cage assembly 70 is used to position and/or locate components in the vault compartment 46. It would be understood that this example is non-limiting, and that the response station 24 can be configured without using the cage assembly 70, by using other attachment and/or mounting methods to position and arrange the various components including the responder tool kit 50, controller 80, communication module 72, station UPS 68, and the required related electrical and/or communication circuitry 95 in the vault compartment 46.

As shown in FIGS. 5 and 7-10, the cage assembly 70 includes a cage 87 and the controller 80, also referred to herein as an alarm controller 80, which is operatively mounted to the cage 87. The cage assembly 70 is shown in additional detail in FIGS. 7 and 8. The cage 87 in the example shown is formed of a plurality of cage frame elements 91, which may be made of a metal material, such as an aluminum-based or steel-based material. In one example, the cage frame elements 91 are metal rectangular hollow tubing which are joined to form the frame of the cage 87. The sides and front of the cage 87 may be left open for ease of accessing the cage 87 to install and/or remove items from the cage 87. In the example shown, a substantially flat panel 85 is attached to the cage 87 to form a cage panel 85 reclosing the rear facing side of the cage 87. The cage panel 85 may be a metal panel for mounting various elements of the cage assembly 87 thereto. A shelf 83 can be attached to the cage 87 to provide a mounting surface for mounting the alarm controller 80 to the cage 87. The example of a cage 87 made of metal cage elements 91 and a metal panel 85 is non-limiting, and it would be understood that the cage 87 can be made of any combination of materials having sufficient strength to support the components mounted and/or attached thereto including the alarm controller 80 and one or more responder tool kits 50.

The cage assembly includes a cage communication module 72, which includes an input/output (I/O) communication interface 74, such as a speaker and microphone interface, for communication between a rapid responder 14 accessing the cage assembly 70 and the monitoring station 12. The cage assembly 70 can include a keypad 76 for providing input to the controller 80, and/or to the facility administrator station 22 and/or monitoring station 12 via the controller 80 or the cage communication module 72, where input to the keypad 76 can include an authentication code, a response code, a diagnostic code, identifying information, maintenance information including a maintenance verification code, programming information, or other information. The keypad 76 and cage communication module 72 can be mounted to the shelf 83, as shown in the non-limiting example. It would be understood that placement of the components in the cage assembly 70 can be varied based on the actual size and shape of the components, etc., to optimize efficiency of use and packaging of space within the cage assembly 70. In one example the controller 80 and/or the keypad 76 can be enclosed within a controller housing 78, which may also be referred to as an alarm enclosure or an electrical enclosure. The controller housing 78, for example, is configured to protect the controller 80 from tampering and/or attack, such that the controller 80 remains functional during an incursion when the cage assembly 70 and/or the vault compartment 34 is accessible. The controller housing 78 may be, for example, resistant to temperature excursions and may be sealed against humidity, water, or other fluids, electrical or magnetic interference, etc. A secondary bioscanner 98 may be mounted to the cage 87 and in communication with the controller 80. The secondary bioscanner 98 can be used, for example, to re-authenticate the identity of an authorized rapid responder 14 during an intrusion event or other to authenticate another authorized person accessing the cage assembly 70 and vault compartment 46, such as a maintenance technician, during a maintenance event.

As shown in the figures, the cage assembly 70 is a standalone structure including the vault cage 87 to which other components of the response station 24 can be fixedly or removably connected or attached to form the cage assembly 70, such that the cage assembly 70 is readily portable to a responder station 24 for installation into a vault 30. The cage assembly 70, in a preferred configuration, weighs less than 100 pounds, and preferably less than 80 pounds, such that the cage assembly weighs substantially less than the vault 30 and is portable to the vault 30 for installation to the vault compartment 46. Multiple apertures 93 can be provided on the cage panel 85 to provide flexibility in mounting the various components of the cage assembly to the cage panel 85, and/or for receiving communication and/or power cables 95 and/or conduit 55 therethrough. The cage assembly 70 can include one or more adjustable features for securely fitting the cage assembly 70 to vault compartment 46. In the example shown in FIGS. 5, 7, 8 and 9, the cage assembly 70 includes adjustable feet 69 which are adjustable in length to position the cage assembly 70 relative to the vault compartment 46 and/or to secure the cage 87 against the interior walls of the vault compartment 46. As shown in FIGS. 9 and 10, the cage 87 can be narrower than the width of the vault compartment, to provide for a storage area 67 adjacent the cage assembly 70. Items which may be longer in length or not readily stored in the cage assembly 70, in storage compartments 56 on the vault door 38, and/or on the responder tool kit 50 may be stored in the storage area 67. For example, one or more long arm weapons can be stored in the storage area 67 and readily retrieved from the vault compartment 46. A bolt cutter 23 of sufficient size to cut through chain, for example, in the event an intruder chains entrances or access points 26 shut to restrain inhabitants 18 on the premises 20, can be stored in the storage area 67. The examples are non-limiting, and it would be understood that the height, width, length and shape of the cage 87 and/or the configuration of the adjustable features can be varied to adapt the cage assembly 70 to various sizes and shapes of vaults 30 and/or vault compartments 46.

The cage assembly 70 can include cable, wiring and/or circuitry 95 for connecting the cage uninterruptible power supply (UPS) 68 and the vault controller 80 to each other and to an external power source 92, and for connecting various powered components such as rechargeable portable communication devices 124, a tool kit power pack 45 and a tool kit charging module 65 to the station UPS 68. For clarity of illustration, only a sample of a cable 95 is shown in the figures. As shown in FIGS. 5 and 7-10, the cage assembly 70 can include an electrical outlet box 71, such as a standard 4-gang box, for connecting to an external power source 92 via a power cable 95 fed through a cage aperture 93 and a power port 53 defined by the vault, and can include an AC/DC (12V DC) power outlet 97 connected to the external power source 92 and/or to the station UPS 68. In the example shown, the power cable 95 may be encased in a protective casing, such as a metal conduit 55 for protection of the power cable 95 from tampering or attack. The vault can include one or more ports 62, 64 for receiving communication and/or power cables 95 from the exterior of the vault to the vault compartment 46. In one example, an auxiliary power port 62 may be defined by the vault to provide a secondary connection to the external power source 92. The protective conduit 55 can be routed from the vault ports 53, 62, 64 to the building structure, for example, to a building wall 57C and/or to a building ceiling 57B to increase tamper resistance.

The communication cables 95 may be of any suitable type for connecting one or more surveillance cameras 138 to a power over Ethernet (PoE) switch 140 in the vault 30 and to a port Ethernet switch 118 in the RRS Network enclosure 114 of the facility administrator station 22, for example, to up feed surveillance video from the surveillance cameras 138 to one or more of the facility administrator station 22, the monitoring station 12, and or a network location corresponding to an IP address designated for each of the cameras 138, during routine surveillance and/or during an incursion. In one example, the communication cables 95 may include CAT 5e, CAT 6, and/or fiber optic cables, as required to transmit data within the premises 20 and/or to a network in communication with the communication network 66 of the premises 20. The communication cables 95 may include cables for connecting the cage communication module 72, for example, to a facility telephone patch panel via the communication port 64, or to a public telephone network service (PTNS) 130, for use by an authorized rapid responder 14 and/or other enrolled user, such as an authorized RRS maintenance technician, for communication with the monitoring station 12 and/or emergency service responders 16 during an incursion or a vault service event. As shown in FIGS. 5, 9 and 10, each of the response stations 24 include a beacon 94 and cellular antennae 101 in communication with the communication network 66, to enable cellular communication with the response station 24.

The response station 24 including the vault 30 and the cage assembly 70 installed therein is configured for secure attachment to a fixture, building 19 or other structure within the premises 20, such as an enclosure 81, where the attachment means are preferable accessible only from within the vault 30, e.g., accessible only through the vault compartment 46, such that removal of the response station 24 from the premises 20 requires unlocking of vault 30 and access to the vault compartment 46. In the example shown in FIG. 5, the vault 30 and the cage assembly 70 are secured to the building wall 57B by vault retainers 59, which in the current example are lag bolts or similar, which are received through apertures 93 in the cage panel and through the rear wall of the vault compartment 46 for attachment to the building wall 57B. Additional vault retainers 59 retain are inserted through the cage floor 89, the floor of the vault compartment 46 and through the vault enclosure 60 into the building floor 57A to retain the responder station 24 to the floor 57A. As shown, the response station 24 may include a vault pedestal 60 to elevate the vault 30 for each of access, and/or to contain and protect incoming external power and/or communication cables 95 and/or protective conduit 55 which may be routed within the pedestal 60 for additional protection. The vault pedestal 60 may be attached to a fixture or building structure 57 of the premises 20 using attachment means such as vault retainers 59 which are accessible only from within the interior space of the pedestal 60 through an access opening or panel (not shown) which is sealed by attachment of the vault 30 to the vault pedestal 60 using attachments which are accessible only through the vault compartment 36. The vault pedestal 60 may be configured to position the vault 30 at an accessible height, to provide protection to conduit for incoming power and communication cables 92, 66, to additionally secure the vault 30 to a structure of the premises 20, etc. The response station 24 and vault pedestal 60 is constructed to be attack resistant, for example, of steel materials and/or other ballistic resistant materials resistant to gun shots, severe blows, fire, etc.

The interior compartment 46 of the vault is preferably illuminated by one or more lights 88 to provide visibility of vault contents to a rapid responder 14, which may include building maps or other building and response information provided in an information panel 48 located in the vault 30. The lights 88 may be powered by the external power source 92 and by the station UPS 68, in the event the external power source 92 has been compromised or terminated during an incursion. Mirrors 90 may be mounted in the vault compartment 46, on the vault door 38 and/or in the station access mechanism enclosure 32, to provide rearward visibility to the rapid responder 14 while accessing the response station 24. In one example, an alarm beacon 94 is affixed externally to the response station 94, and may be activated to alert facility inhabitants 18, rapid responders 14, etc. of a condition such as an incursion or other triggering event and/or to indicate a condition of a response station 24 located proximate to the beacon. The beacon 94 may be activated in response to a signal generated by the response station 24, such as an inventory signal as further described herein, and/or remotely by the monitoring station 12. In one example, the beacon 94 can be positioned proximate to a response station 24 to provide a visual indicator of the location of a response station 24 proximate to the beacon 94. For example, the beacon 94 can be located in a hallway immediately proximate to, for example, above, a door of a room in which a response station 24 is located, such that a rapid responder 14 will be visually notified that a response station 24 is located in the room immediately adjacent the beacon 94. The beacon can be activated to operate in one or more modes, where each operating mode may be characterized, for example, by emitting a light, emitting a light of a predetermined color, emitting a light in a predetermined light pattern (flashing strobe, etc.), emitting an audible signal, emitting an audible signal in a predetermined pattern, and/or a combination of these. In one example, the beacon 94 can be activated in a predetermined mode to indicate the occurrence of an incursion on the premises 20. In another example, the beacon 94 can be activated in a predetermined mode to indicate the response station 24 located proximate to the beacon 94 has been accessed and depleted of all responder tool kits 50 located in that response station 24. The cage assembly 70 and or response station 24 can include one or more tamper sirens 148 which can be activated in response to tampering with the vault 30, in response to triggering of a duress switch 58 in the response station 24, or activated to provide notification to premises inhabitants 18 and/or rapid responders 14 of the occurrence of an incursion or other triggering event.

The response station 24, in the example shown in FIG. 5, includes one or more tamper sensors 82, 84 in communication with the vault controller 80 and configured to output tamper signals via the vault controller 80 to the facility administrator station 12 and/or the monitoring station 12 to signal a condition of the response station 24. For example, the response station 24 may include a door switch sensor 82 to signal opening of the vault door 38, a seismic sensor 84 to indicate seismic impact on the response station 24 such as would be produced by blows to the response station 24 from a weapon, explosive device, etc. The response station 24 can include one or more environmental sensors, such as a temperature sensor 142 to indicate an extreme temperature condition such as would be produced in the event of a fire in the vault compartment 46 and/or surrounding the response station 24. The response station 24 can include other environmental sensors such as a humidity sensor 144 and/or a water sensor 146 to indicate a water ingression and/or high humidity condition in the vault compartment 46 which could be damaging for example, to electronics or corrosion susceptible materials located in the vault compartment 46. The tamper and environmental sensors 84, 142, 144, 146 and the tamper siren 148 can be operatively mounted to the cage 87, as shown in FIGS. 5, 7 and 8, or alternatively, can be mounted within the vault compartment 46.

Access to the vault compartment 34 and to the cage assembly 70 and responder tool kit 50 contained therein is controlled by a station access mechanism 40 as previously described. The station access mechanism 40 of a response station 24 is operatively connected to and in communication with a vault controller 80 contained in the response station 24, and with the monitoring station 12. The station access mechanism 40 is configured to authenticate a person attempting access to the vault 30 using a multifactor authentication system, and to unlock the vault 30 after the person attempting access has been authenticated as an "authorized" user, as further described herein. The access mechanism 40 of each response station 24 is in communication with the controller 80 of that response station 24, where the controller includes an enrolled user database 134 such that each response station 24 can autonomously determine whether a person external to the vault 30 is an authorized person using the access mechanism 40 and the controller 80. In one example, each response station 24 on a premises 20 can be networked with each other response station 24 on the premises 20, such that an authorized user can be authenticated via the network of response stations 24 to access any of the response stations 24 on the premises 20. For example, in a response situation, a rapid responder 14 can be authenticated by any response station 24 on the premises, such that the rapid responder 14 can access the response station 24 which is closest to the rapid responder 14 at the time the triggering event occurs. In the example shown, the station access mechanism 40 includes two authentication devices 44, 42 which are sequentially accessed, e.g., the person attempting access to the vault must be authenticated through a token-based authentication device 44 prior to being given access to a biometric authentication device 42 including a bioscanner, where in the example shown the biometric authentication device 42 is housed within a bioscanner enclosure 32, and must be authenticated through the bioscanner authentication device 42 prior to the vault 30 being unlocked for access by the authenticated user. In an example configuration, authentication device 44 is a non-biometric (token based) authentication device and authentication device 42 is a biometric authentication device, such that to access the vault 30, a person must be in possession of two authentication factors, a non-biometric authentication factor, such as a token, magnetic card, RFID chip, etc., to access the non-biometric authentication device 44, and a biometric factor specific to person, such as a fingerprint, retina, or iris, to access the biometric authentication device 42. In the example shown, the token based (non-biometric) authentication device 44 is one of a magnetic card reader or proximity card reader configured to receive and read a first non-biometric authentication factor which is, respectively, a magnetically coded card having a magnetic code encoded thereon or an encoded proximity card, and the biometric authentication device 42 is one of a retina bioscanner configured to read a retinal pattern of a one or both of a person's eyes and an iris bioscanner configured to collect an image of the iris of one or both of a person's eyes. The examples are illustrative and non-limiting. Other combinations of contact or contactless authentication readers and transponders may be used for the token based authentication device 44. By way of non-limiting example, the token based authentication device 42 may be a contactless RFID receiver configured to receive a signal from an RFID transponder which may be embedded in a card, key fob, armband, etc. For example, the biometric authentication device 42 may include a bioscanner configured to read a fingerprint, palm print, hand geometry, retinal pattern, and/or to perform iris recognition or face recognition as a means of authenticating a biometric factor of the specific individual attempting access of the vault 30. Additional authentication steps may be included in the authentication process, such that the multifactor authentication process may include more than two authentication factors or authentication steps. For example, the proximity card used to access the token based authentication device 44 may be associated with a specific user, such that the proximity card used to access the token based authentication device 44 must be matched with the biometric data obtained from the user through the biometric authentication device 42 prior to unlocking the vault 30. In one example, the biometric authentication device 42 includes an adjusting mechanism 35, shown schematically in FIG. 6, for adjusting the height of the biometric authentication device 42 to an iris height of the person assigned to the token used with the token based authentication device 44 to release the bioscanner enclosure 32 and access the biometric authentication device 42. By adjusting the biometric authentication device 42 to the iris height of the person authenticated by the token based authentication device 44 as the enclosure 32 is opening, the amount of elapsed time required to scan the person's iris is decreased as the person does not have to adjust to a fixed bioscanner height, with a corresponding decrease in the time to access the cage assembly 70 and the responder tool kit 50 in the vault 30.

An enrolled user database 134 accessible by the facility administrator station 22 and/or the central monitoring station 12 and downloaded to each controller 20 is maintained for the RRS 10, and includes the authentication factor data (token identification, biodata) of each enrolled user of the RRS 10. "Enrolled users," as that term is used herein and for example, may include rapid responders 14 affiliated with the premises 20, one or more RSS facility administrators of the premises 20, and non-responder RSS trainers and/or maintenance personnel qualified to maintain and service the RSS 10 including the response stations 24 installed on the premises 20. Each of the enrolled users in the enrolled user database 134 are further identified in the enrolled user database 134 as either an "authorized" user or as an "unauthorized" user, where only "authorized" users are allowed access to the vault 30 by the station access mechanism 40. An "authorized" status of a user may require, for example, that the user has completed training, has been initially qualified through an initial vetting process which may include background checks and performance testing, is expected to be on premises 20 at the time the user attempts authentication, for example, is a current employee of the premises/facility expected to be at work on premises 20, and has remained in an "authorized" status during periodic reevaluation of the status of the user using predetermined criteria which may include updated background checks, monitoring of life change events such as divorce, physical and/or mental health conditions, bankruptcy, civil infractions and/or criminal activity, etc. A user may be enrolled in the enrolled user base 134 but designated as "unauthorized" in the database 134, for example, if the user has been disqualified and/or deauthorized based on one or more disqualification criteria during the initial vetting process or during periodic and/or subsequent vetting of the user. The disqualification and authorization vetting criteria may be customized and/or predetermined for the premises 20 based on the type of facility, the nature of activities occurring on the premises 20, the criteria established for rapid responder qualification by the premises management, etc., and may include weighting factors applied to the various disqualification criteria. The disqualification and authorization vetting criteria may be programmed into vault access software 106 used by the facility administrator station 22 to maintain the enrolled user database 134. Disqualification and authorization vetting criteria, by way of example, may include a user's failure to meet continuing RRS qualification requirements, stress-inducing events occurring in the user's life such as a serious illness, divorce, bankruptcy, etc., discharge from employment by the facility/premises 20, or other disqualifying events such as criminal or civil violations, arrests, etc. A user may be designated as "unauthorized" in the database 134 on a permanent basis or for a temporary time period. For example, a user may be temporarily designated as "unauthorized" for a period of time the user is scheduled to be off premises due to vacation, medical leave or temporary disability. Each user is dynamically vetted, e.g., is periodically reevaluated at a predetermined frequency or as needed based on the occurrence of a life event, for example, such that the vetting process is continuous and dynamic for each user, including each rapid responder 14.

The station access mechanism 40 may include a duress switch 58 (see FIG. 6) which can be activated by a rapid responder 14 or other authorized user accessing the response station 24, to send a duress signal to the central monitoring station 12 via the vault controller 80. The duress switch 58 may be hidden or otherwise camouflaged such that it is not detectable as a duress switch 58 by an observer, for example, an attacker, who has gained access to the station access mechanism 40, for example, by force or by use of an improperly acquired first authentication factor (proximity card, in the example), such that a qualified user in the presence of the attacker may trigger the duress switch without knowledge of the attacker. For example, the duress switch 58 may be camouflaged as a power switch or provided as an unmarked toggle or button switch within the enclosure 32. Triggering the duress switch 58 sends a signal to the vault controller 80 and/or the monitoring station 12, to alert these of a duress event. In one example, triggering the duress switch 58 sends a signal to the vault controller 80 to lockout the vault latching mechanisms 96 of the vault 30 for a predetermined period of time, for example, 10-15 minutes, such that even with input of an authorized biosignature to the biometric authentication device 42 the vault 38 will not be released, e.g., the vault 30 will not be unlocked, thereby remaining secured from access by an attacker. The duress switch 58 may be triggered, for example, by an authorized user, which may be a rapid responder 14 who is in the presence of an attacker, and/or is unable to complete additional actions to respond to the incursion, for example, due to injury or incapacitation, where the duress switch 58 provides notification to the RRS 10 of an actual incursion or the substantial probability that an incursion or triggering event has occurred. The response station 24 may include more than one duress switch 58. For example, another duress switch 58 may be located on the exterior of the response station 30 in a nondescript or camouflaged location, and/or may be located inside the vault compartment 46 to enable a person accessing the vault 30 to send a duress signal without detection.

The response station 24 includes a failsafe vault access device 156 (see FIG. 5) which may be used to access the vault 30 in the event of a total power failure within the vault 30. By way of non-limiting example, the failsafe vault access device 156 may be a switching device or a mechanical device. The illustration shown in the figures is non-limiting, and it would be understood that the failsafe vault access device 156 can be located on the vault 30 in the handle 36, the door 38, and/or in another location on the vault 30 to actuate access to the vault 30 in the event of a total power failure within the vault 30.

Responder Tool Kit and Tool Kit Holder

As shown in FIGS. 5, 9 and 10, at least one responder tool kit 50 is stored in the vault compartment 46 of the vault 30, and is accessed by a rapid responder 14 for use in responding to an incursion, a triggering event, and/or an attacker. The responder tool kit 50, shown in additional detail in FIGS. 11 and 12, includes a vest 52 and a defense device 54. The vest 52 a ballistic vest, which may also be referred to or known as a bullet-resistant vest, a bullet-proof vest, and/or body armor, configured to absorb the impact from firearm-fired projectiles and shrapnel from explosive devices or explosions and to be resistance to stab and slash attacks from knives and similar close-quarter weapons. The vest 52 may be reinforced with a ballistic insert 51 comprising ceramic or metal plates to provide protection from rifle rounds, for example. As shown in FIG. 12, the vest 52 can include a re-closeable opening 41 for inserting the ballistic insert 51, such that the type and/or configuration of the ballistic insert 51 can be readily modified, and/or a ballistic insert 51 can be readily removed from one vest 52 and inserted to another, for example, in the event of damage to the first vest 52. In one example, the vest 52 is made from a vest material 75 which is a ballistic nylon material or similar rip stop-type nylon material. In a non-limiting example, the vest material 75 is a S/100 Denier nylon material. In a preferred configuration the vest material 75 is brightly colored such that the vest 52 is highly visible and/or readily distinguishable, for example, by an emergency service provider 16, such as a responding police officer or SWAT team member, to readily differentiate an authorized rapid responder 14, for example, from an attacker or intruder. In one example, the vest material 75 can be one of chartreuse, chartreuse-yellow/green, safety yellow/green, or another highly visible color such as bright orange. The vest 52 can further include one or more badges 37 to identify the rapid responder 14 to inhabitants 18 of the premises and/or to emergency service providers 16. For example, the badge 37 can display the word "STAFF," "RESPONDER," "SECURITY," or similar, or the name of the premises 20, e.g., "LINCOLN SCHOOL," "GRACE HOSPITAL," etc. The vest 52 can include a system of straps and/or attachment interfaces 25, which in one example may be a modular lightweight load-carrying equipment (MOLLE) system and one or more of the tool kit elements may be attached to the vest 52 using MOLLE-compatible pouches or attachments. The vest 52 includes one or more quick adjustment straps 43, for quickly resizing the vest 52 to the size of the rapid responder 14 donning the vest 52.

The defense device 54 is provided with the responder tool kit 50 for use by the rapid responder 14 to deter or impede the attacker, which may include use of the defense device 54 to disarm or immobilize the attacker. In the non-limiting example, the defense device 54 is a firearm such as a handgun. The responder tool kit 50 includes ammunition 49 for the defense device 54, and can include ammunition preloaded to the defense device 54 and/or surplus ammunition stored in the vault compartment 46 and/or a storage compartment 56. The tool kit 50 may include one or more defense devices 54, including, for example, one or more firearms such as a handgun, pistol, revolver, long gun, automatic rifle, or shotgun, bear or pepper spray, baton, billy stick, and/or a stunning device such as a stun gun, stun baton or TAZER®. Long guns or other defense devices 54 which could be awkward to attach to the vest 52 can be stored in a storage area 67 and/or mounted to the case assembly 70, and/or mounted to the surface of the vault compartment 46, preferably using quick release attachments. The examples provided herein are non-limiting, and other defense devices 54 may be provided for use by the rapid responder 14 as appropriate to the type of premises 20 to which the RRS 10 is installed, the nature of activities performed on the premises 20, etc. For example, other defense devices 54 such as tear gas, smoke bombs, etc. may be included in the responder tool kit 50 and/or provided with the cage assembly 70 and/or stored in the vault compartment 46.

The responder tool kit 50 can include one or more portable communication devices 124 for communicating other rapid responders 14 via the portable communication devices 124 on responder tool kits 50 retrieved by the other rapid responders 14, and/or with emergency service providers 16, for example, having access to a radio frequency and/or IP address designated for the portable communication devices 124, to provide information regarding the status of the incursion, attacker, premises inhabitants 18 and/or premises conditions, and/or information regarding the status, actions, location and/or condition of the rapid responder 14. The portable communication devices 124 may include one or more of a two-way radio operating on a designated radio frequency predetermined for the premises 20, a real time location (RTL) pendant having a dedicated IP address, a video surveillance system having a dedicated IP address, such as a body camera 136 incorporated into the vest 52, a mobile telephone (shown as an additional took kit element 47), etc. The responder tool kit 50 can include a hands free input/output device 86 for hands-free communication via the portable communication device 124. The hands free device 86 can a wired input/output device 86 such as a label microphone or headset attached to the portable communication device 124 as shown in FIG. 11, or can be a wireless input/output device 86 such as an earpiece/microphone device. Real time information may be provided from the rapid responder 14 via the portable communication device(s) 124, the on-vest camera 136, premises surveillance cameras 138, etc., to emergency service providers 16, via the monitoring station 12 including, for example, information regarding the intrusion and/or the attacker, the condition of the premises 20 and/or the inhabitants 18, responder location information from an on-vest location pendant, etc. In one example, one or more of the portable communication devices 124 and/or the on-vest camera 136 can be configured to transmit streaming video to an IP address known to the monitoring station 12, such that the monitoring station 12 can access, retrieve, distribute and/or otherwise disseminate the real time information in real time, for example, to emergency service responders 16, which substantially increases situational awareness for emergency service responders 16 prior to arrival on the premises 20 and during a response action.

The responder tool kit 50 can include a trauma kit 126 to provide emergency medical treatment to inhabitant victims of the attacker, for example, including equipment and supplies to respond to and/or treat bleeding, breathing and/or shock trauma of a victim inhabitant 18 or a victim rapid responder 14. For example, the trauma kit 126 may include hemorrhage control supplies such as coagulating agents, occlusive seals also known as halo seals, pharyngeal/intubation tubes for aspirating victims, tourniquets, etc. The trauma kit 126 may be customized for the premises inhabitants, for example, a trauma kit 126 for use at a school premises 20B may include child sized tourniquets and child sized pharyngeal tubes.

The description of the responder tool kit 50 provided herein is not intended to be limiting, and the responder tool kit 50 and/or vault 30 may include other tools which may be added to the vest 52 and/or accessed by the rapid responder 14 in responding to an incursion, triggering event and/or attacker. By way of non-limiting example, the responder tool kit 50 and/or vault 30 may include a flashlight 128 or other portable light source, maps or schematics of the premises 20 showing, for example, room layouts, locations of access points 26, locations of other response stations 26 or other emergency response equipment such as fire extinguishers, fire hoses or legacy security system 132 resources, and additional protective or defensive equipment such as gas masks, body armor, fire-resistant apparel, night-vision goggles, etc.

Electrically powered items included in the responder tool kit 50 can be powered by rechargeable power sources, and releasably electrically tethered to the power source 92 and/or the UPS 68 during storage of the responder tool kit 50 in the vault 30, such that the electrically powered items such as flashlights 128, portable communication devices 124, stun weapons, RTL pendants, vest cameras 136, etc. are continuously maintained in a fully charged state and are fully powered at time of deployment. In one example shown in FIGS. 5 and 7-10, the case assembly 70 includes a tool kit holder generally indicated at 61 for removably attaching (hanging) one or more responder tool kits 50 in the cage assembly 70. In a non-limiting example, the tool kit holder 61 includes one or more pivoting arms 63 upon which a responder tool kit 50 can be hung. The pivoting arm 63 can be pivoted out from the vault compartment 46 for quick removal of the responder tool kit 50 and donning of the vest 52 by a rapid responder 14. The tool kit holder 61 can include a tool kit charging module 65, which may be integral to the holder 61 and/or mounted in the cage assembly 70 proximate the tool kit holder 61. The charging module 65 is electrically connected to the external power source 92 via the station UPS 68, such that in event of interruption of the external power source 92 to the response station 24, rechargeable electronic components included in the responder tool kit 50 will continue to be charged by the station UPS 68.

In one example, the charging module 65 can include a plurality of quick release connectors 77A, 77B, 77C ... 77n, also referred to as breakaway connectors, for receiving a charging cord 29. The charging cord 29 is terminated at each end by a quick release connector 77 such that upon removal of the responder tool kit 50 from the tool kit holder 61, to charging cord 29 separates from the tool kit component being charged, for example, from the flashlight 128, the portable communication device 124, etc., and such that removal of the tool kit 50 from the tool kit holder 61 is unhindered. In another example shown in FIGS. 9-12, the vest 52 includes an cable assembly 39, which may also be referred to herein as a wiring harness, which is integral to and/or operatively attached to the vest 52. The wiring harness 39 includes at least one power input connector 31 and one or more power output connectors 73 distributed in various locations on the vest 52 and/or the MOLLE system 25. The wiring harness 39 may be removable from the vest 52, for example, via the opening 41, and/or reconfigurable to reposition the locations of the connectors 31, 73 relative to the position of tool kit components attached to the vest 52. The connectors 31, 73 are preferably quick release (break away) type connectors. In the example shown, each took kit component which is rechargeable, such as the flashlight 128, is connected to a power output connector 73 of the wiring harness 39. The charging cable 29 is connected to the power input connector 31 and to one of the charging port connectors 77A ... 77n on the charging module 65, such that electrical power flows from the charging module 65 through the charging cord 29 and the wiring harness 39 to each of the rechargeable took kit components connected to a respective power input connector 31 of the wiring harness 39. Upon removal of the tool kit 50 from the tool kit holder 61, the charging cord 29 releases from the power input connector 31, such that removal of the tool kit 50 is unhindered. This arrangement is advantaged by requiring only one charging cable 29 for each responder tool kit 50 in the response station 24, rather than a plurality of charging cables 29 for attaching to each of the rechargeable components on the tool kit 50, where the plurality of charging cables 29 present opportunity for tangling and/or interference with quick and unhindered removal of the tool kit 52 from the holder 61. In another example shown in FIGS. 9-12, the responder tool kit 50 can include a rechargeable power pack 45 attached to the vest 52 for use in powering and/or recharging one or more electrically powered components included in the tool kit 50. In the example shown, the power pack is electrically connected to the power input connector 31 of the wiring harness 39 and to the charging cord 29 by a power input connector 31 of the power pack 45, such that the wiring harness 39 is electrically connected to the charging cord 29 via the power pack 45, and such that power flowing through the charging cord 29 charges the power pack 45 and components attached to the wiring harness 39. Upon removal of the tool kit 50 from the holder 61, the charging cord 29 is disconnected from a quick release power input connector 31 of the power pack 45. The components attached to the vest 52 and to the wiring harness 39 remain attached to the wiring harness 39 and electrically connected to the power pack 45 until removed for use and/or disconnected from the wiring harness 39. The power pack 45 thus is available as an auxiliary power source to power and/or recharge tool kit components connected to the wiring harness 39. It would be understood that the power pack 45 could be disconnected from the wiring harness 39 and selectively connected to an electrically powered component such as the portable communication device 124 to provide an auxiliary power source to that component.

In an example shown in FIG. 10, a charging cord 29C includes an inventory sensor 27, also referred to herein as a tethering sensor, configured to sense removal of a tool kit 50 from the holder 65 when the tool kit 50 connected to the charging port 65 by the charging cord 29C. In the example shown, the charging cord 29C including the tethering sensor 27 is used to connect the rearmost tool kit 50C, e.g., the last removed tool kit 50C in the response station 24, to the charging port 65. As shown in FIG. 10, tool kits 50A and 50B would be removed prior to removing the rearmost tool kit 50C. Upon removal of the last tool kit 50C, the tethering sensor 27 outputs an inventory signal indicating the response station 24 has been depleted of all tool kits 50 stored in the response station 24. Output of the inventory signal actuates the beacon 94 located proximate the response station 24 to operate in a predetermined mode which indicates the response station 24 is depleted of responder tool kits 50, e.g., no longer contains a responder tool kit 50. The mode of the beacon 94 indicating a depleted response station 24 may include the beacon 94 exhibiting a certain color light, a pattern of light, and/or an audible signal or pattern of audible signals. A rapid responder 14 can observe the operating mode of the beacon 94 from a distance, can recognize from the mode that the response station 24 is depleted, and proceed immediately to another response station 24 without being delayed by accessing the depleted response station 24. In another example, the rearmost tool kit 50C is attached via a charging cord 29 to a designated charging port 77C, which in the present example is the rearmost charging port 77C. The designated charging port 77C includes an inventory sensor 33, also referred to herein as a circuit sensor, which outputs an inventory signal when the charging cord 29 is disconnected from the rearmost took kit 50C, opening the charging circuit and triggering the circuit sensor to output the inventory signal. Output of the inventory signal actuates the beacon 94 located proximate the response station 24 to operate in a mode which indicates the response station 24 is depleted of responder tool kits 50, e.g., no longer contains a responder tool kit 50, as previously described.

Rapid Response Method

A non-limiting example of a method for deploying the rapid response system (RRS) 10 is shown in FIG. 13 and generally indicated at 200. The flowchart 200 is illustrative of an example method for the deployment of the RRS 10, such that it would be understood that various elements of the method may be rearranged, modified, supplemented, etc. as required to deploy the RRS for a particular premises 20 and in consideration of the characteristics and needs of the facility inhabitants 18 of the premises 20, the nature of threats anticipated by the premises 20, etc.

In the example shown, at step 205 a person external to the response station 24 presents an authentication token to the token based authentication device 44 for authentication. The controller 80 determines whether the token is an authorized authentication token. When the token is determined to be an authorized authentication toke, the method 200 proceeds to step 210 and the person is given access to the biometric authentication device 42. At step 210 the biometric authentication device 42 collects biodata from the person and provides the biodata to the controller 80. In one example, step 205 is optional, for example, where the biometric authentication device 42 is not enclosed by a bioscanner enclosure 32, and the method begins with step 210. This may be the case, for example, where the response station 24 is located in a premises 20 which is a private home or other building 19 where enclosure of the biometric authentication device 42 by an enclosure 32 and secondary authentication using the token based authentication device 44 is not deemed necessary to prevent tampering with the biometric authentication device 42, and/or where single factor authentication by biometric data is considered sufficient to authenticate an authorized person. At step 215, the controller 80 determines whether the biodata received at step 210 is biodata of an authorized person and vets the incoming biodata. The authentication input provided by the person attempting access to the vault 30 at step 210 is vetted at step 215 to determine whether the person attempting access is an authorized user, for example, by comparison of the biometric data received at step 210 to an enrolled user database 134. Step 210 may include the person accessing the biometric authentication device 42 inputting a duress signal using a duress switch 58, where the duress signal is then vetted at step 215. Vetting the duress signal at step 215 may include responding to a duress event at step 260 by locking out the vault 30 for a predetermined time frame, for example, to delay or prevent access to contents of the vault 30 by an unauthorized user in the presence of the rapid responder 14 attempting to access the vault 30 under duress or threat by the unauthorized user, who may be an intruder/attacker. The monitoring station 12 in response to a duress signal may notify at least one of an emergency services provider 16 and the facility administrator of the distress signal, including information regarding the duress signal and identifying the response station 24 from which the duress signal originated at step 260.

Where the vetting at step 215 determines the person is an authorized rapid responder 14, the vault is unlocked at step 235 and the rapid responder 14 accesses the vault 30 to retrieve the responder tool kit 50 at 240. Concurrently with unlocking the vault at step 235, at step 220 notification of a vault opening and/or potential incursion, including an alarm and vault identification information, is sent to the monitoring station 12, for example, by the vault controller 80. At step 225, the monitoring station 12 contacts the identified vault 30 and communicates with the rapid responder 14 via the cage communication module 72, to verify the alarm and the presence of an incursion/attack and to exchange information related to the incursion. At step 230, upon verification of the incursion/attack, the monitoring station 12 contacts emergency service providers 16 for dispatch to the premises 20. At step 225, the monitoring station 12 may notify premises inhabitants 18, rapid responders 14, and/or the facility administrator station 22 of the occurrence of the incursion/attack using, for example, mass communication software to send notification via one or more of text messaging, instant messaging, or other short messaging service (SMS), by e-mail, voicemail, etc.

At step 240, the rapid responder 14 retrieves the responder tool kit 50 from the vault compartment 46 and dons the vest 52, which may include activating a hands free input/output device 86, a two-way radio 124, or other communication device to enable communication between the rapid responder 14 and other rapid responders 14 who have retrieved a responder tool kit 50 and/or emergency service providers 16 who have access to radio communication with the rapid responders 14 via a radio frequency designated for the premises 20, during response to the incursion. Step 240 can include activating a vest camera 136, which may be a live feed camera feeding surveillance video and/or activating a real time location (RTLS) pendant feeding location information, where each of these has a dedicated IP address such that the real time surveillance video and/or location information is accessible by the monitoring station 12 which has knowledge of the IP addresses of each device. The monitoring station 12 access, retrieve, distribute and/or otherwise disseminate the real time location and/or surveillance data, for example, by providing IP address information to emergency service providers 16, retrieving the real time information and rebroadcasting in real time, provide a communication link to retrieved real time information, etc., such that the emergency service providers 16 can access and/or otherwise utilize the real time information to assist in planning and deploying a response to the incursion event. At step 250, the rapid responder 14 responds to the incursion/attack, which may include using one or more defense devices 54 provided with the responder tool kit 50 to respond to the attacker. Responding to the attacker may include taking actions to impede, isolate, or immobilize the attacker, or otherwise reduce the attacker's ability to present a threat of injury or death to the premises inhabitants 18, where such actions may include using lethal force against the attacker.

At step 255, scheduled maintenance is performed on the response station 24, which may include vetting an alarm notification at step 215 to confirm the alarm received from the response station 24 is associated with a bona fide scheduled maintenance event. Alarm vetting at step 215 may including vetting one or more of a plurality of alarms and/or alarm notifications generated by the alarm station 24 to the monitoring station 12, which may include alarm notifications in response to signals output from one or more tamper sensors included in the response station 24 such as a seismic sensor 84, one or more environmental sensors included in the response station 24 such as a temperature sensor 142, a water sensor 146, a humidity sensor 144, etc, as previously described herein. Vetting the alarm signal may include receiving additional input provided through at least one of the response station 24, and the monitoring station 12, and/or provided by one or more of the facility administrator, a rapid responder 14, and/or other authorized user, such as maintenance personnel authorized to access the response station 24. For example, a user accessing the vault 30 to perform a maintenance function may be required to input a maintenance code via the controller interface 76 and/or via the communication interface 72 at the initiation and/or completion of a maintenance event and/or periodically during an ongoing maintenance event, which may be monitored by monitoring station 12.

It would be understood that the method represented by FIG. 13 is illustrative and variations of the method, including rearranging, deleting, supplementing, and modifying the steps of the flowchart 200 as required to implement an RSS 10 in a specific premises 20 according to the specific needs, inhabitants 18, configuration and objectives of the premises 20 may be made within the scope of the description provided herein. Further, the flowchart 200 may be modified to incorporate the various features, elements and characteristics of the RSS 10 described herein.

Rapid Responder Selection, Training and Qualification

Figure 14:
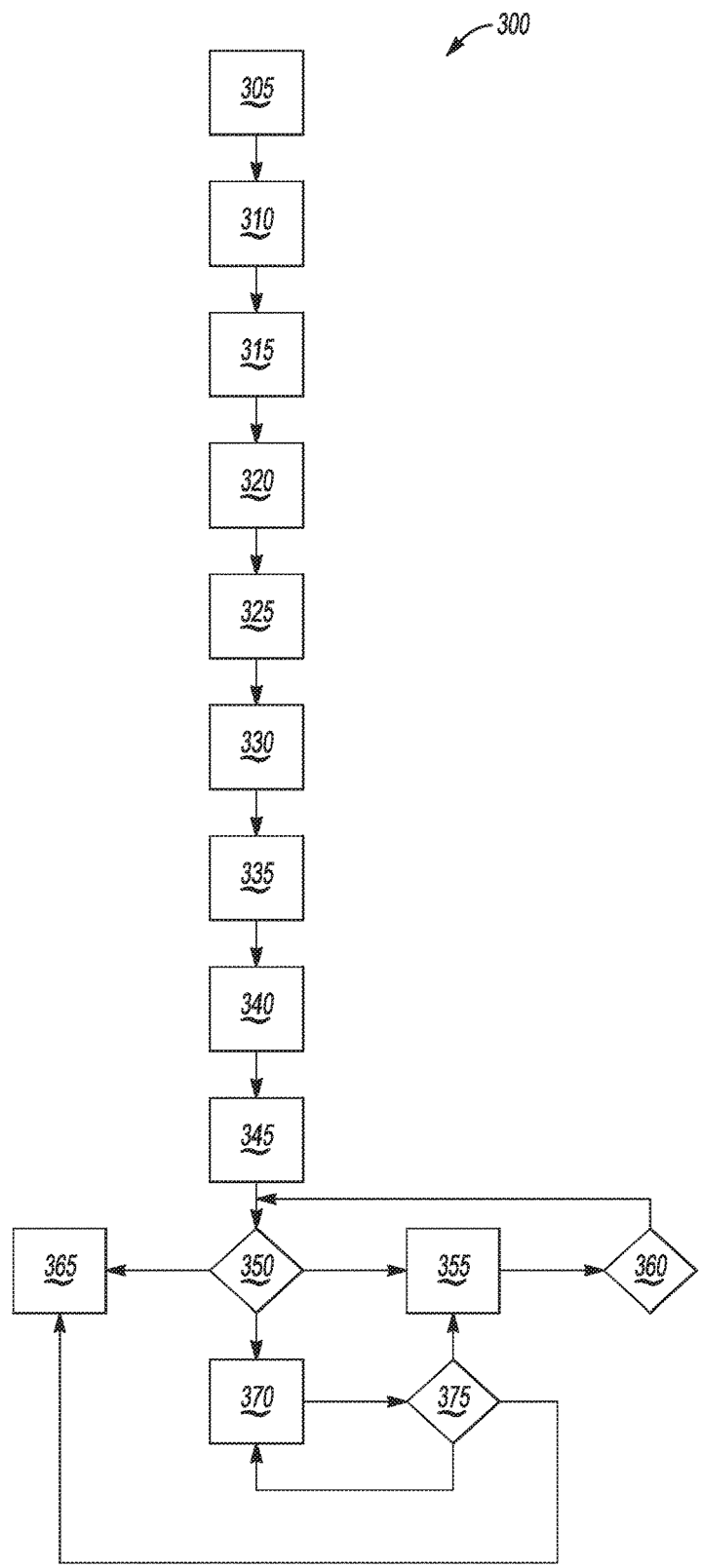
FIG. 14 is a schematic illustration of a flowchart for implementing the rapid response system for a premises.

The RRS 10 system and method includes a system and method 300 shown in FIG. 14 for the initial selection, training, and qualification of rapid responders 14. As shown in FIG. 14, the method 300 begins with a premises 20 contracting for installation of the RSS 10 on the premises 20 at step 305, where the contracting process may include surveying the premises 20, determining an appropriate number and location of response stations 24 to be installed on the premises 20, determining an appropriate number of rapid responders 14 to be trained and qualified to provide a sufficient number of authorized rapid responders 14 on premises 20 during hours of operation of the premises 20 and/or as requested by the premises 20. Initial selection of candidates to be trained as rapid responders 14 begins at step 310 with a presentation made to premises inhabitants 18 who may have an interest in applying to become rapid responders 14. The information presented to premises inhabitants 18 at step 310 may include an overview of the RRS 10, information regarding the application and applicant vetting process, an overview of the training curriculum, physical and/or mental expectations of rapid responders 14, etc. At step 315 premises inhabitants 18 who are interested in presenting themselves as candidates to be trained as rapid responders 14 complete a participant application providing information regarding the participant and the participant's background.

At step 320, the completed applications are reviewed for identification of potential candidates for training as rapid responders 14. Input from management or leadership of the premises 20 may be solicited during identification of candidates, which may include additional candidate information such as work history, work performance and attendance records, etc. At step 330, applicants which have been selected as potential candidates for RSS training are subjected to additional screening, which may include, by way of non-limiting example, background checks, drug testing, and psychological assessment using tools such as the Minnesota Multiphasic Personality Inventory (MMPI-2), and candidates for RSS training are selected using the additional screening input. At step 330, the selected candidates are notified of acceptance into training and training instructions.

At step 335, the selected candidates are trained using a curriculum which includes both classroom and performance based training, as well as simulation exercises including simulated events conducted in a training environment configured to at least partially simulate the actual premises 20 to which the rapid responder candidates will be deployed upon qualification and authorization, where the simulated premises 20 includes at least one response station 24. Configuring the simulated premises 20 may incorporate video of the premises 20 and/or replication of certain elements or fixtures of the premises 20. The training curriculum can include training in the operation of the response station 24 including the access mechanism 40 and communication module 72, defensive training including training in the use of lethal force, use of weapons, trauma care, tactical movement, and scenario engagement. Training may be delivered using simulated environments and or simulators, and includes a hand-off module for transitioning control and response to an incursion situation to emergency service providers 16.

At step 340, candidates which have successfully completed the training curriculum, including performance testing and skills demonstrations required as part of the curriculum, become qualified and are designated as qualified rapid responders 14.

Rapid responders 14 are enrolled in the enrolled user database 134 at step 345, where the enrolled user database 134 may include information specific to each of the rapid responders 14 as collected through the selection, training and qualification steps 315 to 335. Additional information specific to each of the rapid responders 14 is included in the enrolled user database 134, including, for example, biometric data collected from each respective rapid responder 14 such as retinal patterns, iris scans, fingerprints, hand prints, facial structure, etc., and other authenticating data such as identifying information of authentication factors such as magnetic or proximity cards issued to the respective rapid responder 14, etc.

At step 350, each of the enrolled users in the enrolled user database 134 is further identified in the enrolled user database 134 as either an "authorized" user or as an "unauthorized" user, where only "authorized" users are allowed access into the vault 30 by the station access mechanism 40. An "authorized" status of a user may require, for example, that the user has completed training, has been qualified through a vetting process which may include background checks and performance testing, and is expected to be on premises, for example, is a current employee of the premises/facility expected to be at work on premises. At step 355 a user who is identified as an "authorized" user at step 350 is entered into the enrolled user database 134 as an "authorized" user and the method proceeds to step 360, where a routine reevaluation frequency is established for the authorized user, and the authorized user is monitored for any changes in circumstances, behavior or conditions which require a re-evaluation of the "authorized" status of the user prior to the routine reevaluation determined by the reevaluation frequency, for example, in the event of an occurrence life event or other change in situation related to the authorization criteria and/or warranting reevaluation, such that each user in the enrolled user database 134 is dynamically and routinely reevaluated for ongoing authorization. If re-evaluation is indicated, either by tolling of the routine reevaluation period or occurrence of a life event, the method returns to step 350 and the user is reevaluated.

A user may be enrolled in the enrolled user base 134 but designated as "unauthorized" in the database 134, for example, if the user has been disqualified based on one or more disqualification criteria. The disqualification criteria may be customized for the premises 20 based on the type of facility, the nature of activities occurring on the premises 20, the criteria established for rapid responder qualification by the premises management, etc., and may include weighting factors applied to the various disqualification criteria. The disqualification criteria may be programmed into vault access software 106 used by the facility administrator 22 to maintain the enrolled user database 134. Disqualification criteria, by way of example, may include a user's failure to meet continuing RRS qualification requirements, stress-inducing events occurring in the user's life such as a serious illness, divorce, bankruptcy, etc., discharge from employment by the facility/premises, or other disqualifying events such as criminal or civil violations, arrests, etc. A user may be designated as "unauthorized" in the database 134 on a permanent basis or for a temporary time period. At step 365, an enrolled user who is "unauthorized" on a permanent basis at step 350 can be removed from the database 134 and/or designated in the database 134 as "permanently unauthorized." At step 370 a user temporarily designated as "unauthorized" is entered into the enrolled user database 134 as "temporarily unauthorized", where the designation may be associated with a date at which re-evaluation of the user is to occur. For example, a user may be temporarily designated as "unauthorized" for a period of time the user is scheduled to be off premises due to vacation, medical leave or temporary disability. At step 375, the "temporarily unauthorized" user is re-evaluated to determine if the condition causing the designation of "unauthorized" has been resolved. For example, a user which has returned from vacation can be re-authorized at step 375 and the method proceeds to step 355 where the user's status in the enrolled user database 134 is updated to "authorized." At step 375, re-evaluation of the "temporarily unauthorized" user can result in the user being identified as "permanently unauthorized" for example, due to a disability which has become permanent and is of the nature that the user can no longer perform the expected duties of a rapid responder 14. In this event, the method proceeds to step 365 and the user is designated as "permanently unauthorized" in the enrolled user database 134 and/or is removed from the enrolled user database 134. At step 375, re-evaluation of the "temporarily unauthorized" user can result in the user being retained in this designation, for example, due to an extension of a leave of absence, and the method returns to step 370 with a subsequent re-evaluation date established. Each time a user status is changed in the enrolled user database 134, the facility administrator station 22 provides an updated enrolled user database 134 to the controller 80 of each vault station 24 included in the premises 20 administered by the facility administrator station 22.

While the best modes for carrying out the invention have been described in detail, those familiar with the art to which this invention relates will recognize various alternative designs and embodiments for practicing the invention within the scope of the appended claims.

What is claimed is:

1. A system for a rapid responder to access a response station in response to a triggering event to retrieve a responder tool kit including a weapon, the response station including a vault containing the responder tool kit, the system comprising:
   the response station comprising:
      the vault, wherein the vault comprises:
         a vault compartment defined by an interior surface of the vault;
         a vault door attached to the vault;
         a vault latching mechanism in communication with an access mechanism;
         wherein the vault latching mechanism is selectively actuable by the access mechanism to lock and unlock the vault door;
         wherein the vault compartment is accessible when the vault door is unlocked;
         wherein the vault compartment is enclosed and not accessible when the vault door is locked;
      the response station further comprising:
         a portable cage assembly comprising:
            a standalone cage structure;
            a controller mounted to the standalone cage structure;
            wherein biodata of at least one rapid responder is stored on the controller;
            wherein the portable cage assembly is adjustable in size and removably positioned in the vault compartment such that the controller is:
               physically accessible within the vault compartment; and
               in communication with the vault latching mechanism;
      a responder tool kit comprising:
         a ballistic vest; and
         the weapon;
         wherein the responder tool kit is positioned within the vault compartment such that the responder tool kit is removable from the vault compartment when the vault door is unlocked;
      the response station further comprising:
         the access mechanism;
         wherein the access mechanism comprises:
            an enclosure attached to an exterior surface of the vault;
            a biometric authentication device enclosed within the enclosure such that the biometric authentication device is accessed by opening the enclosure;
            a token-based authentication device;
            wherein the token-based authentication device is located outside the enclosure and is actuable by presentation of an authorized authentication token to open the enclosure;
            wherein the authorized authentication token is associated with at least one rapid responder authorized to access the vault compartment;
            wherein the biometric authentication device is actuable by biodata of the at least one rapid responder authorized to access the vault compartment; and
         wherein actuation of the biometric authentication device by the biodata of the at least one rapid responder actuates the access mechanism to contemporaneously:
            actuate the vault latching mechanism to unlock the vault door such that the responder tool kit is removable from the vault compartment by the at least one rapid responder; and
            output an alarm signal to at least one of an emergency services provider and a monitoring station.

2. The system of claim 1, further comprising:
   wherein the access mechanism is in communication with the controller;
   wherein the controller, upon receiving biodata inputted to the biometric authentication device, determines whether the biodata inputted to the biometric authentication device matches the biodata of the at least one rapid responder;
   wherein the controller, upon determining a match between the biodata inputted to the biometric authentication device and the biodata of the at least one rapid responder, authenticates to the biometric authentication device that the biodata inputted to the biometric authentication device is that of the at least one rapid responder authorized to access the vault compartment; and
   wherein, the access mechanism upon receiving authentication from the controller, contemporaneously:
      outputs the alarm signal; and
      actuates the vault latching mechanism to unlock the vault such that the vault compartment is accessible by the authorized rapid responder.

3. The system of claim 2, wherein the biometric authentication device includes an iris scanner; and
   wherein the biodata inputted to the biometric authentication device includes an iris image scanned by the iris scanner.

4. The system of claim 2, further comprising:
   a communication module having a communication interface for communication with the authorized rapid responder;

wherein the communication module is positioned within the vault compartment; and wherein the communication module is configured for verbal communication between the authorized rapid responder and at least one of a monitoring station and an emergency services provider.

5. The system of claim 4, wherein the monitoring station is in communication with an emergency services provider; and wherein the emergency services provider is in communication with the communication module via monitoring station.

6. The system of claim 2, further comprising an intrusion sensor in communication with the controller;
wherein:
the intrusion sensor outputs an intrusion signal to the controller upon detecting an intrusion condition of the vault; and
the controller, in response to the intrusion signal, outputs an intrusion alarm to at least one of an emergency services provider and a monitoring station.

7. The system of claim 2, wherein the responder tool kit further includes a portable communication device.

8. The system of claim 1, further comprising:
a shot detector located external to the response station;
wherein the shot detector is configured to output a shot detection signal to at least one of an emergency services provider and a monitoring station upon detecting a shot occurring on a premises including the response station.

9. The system of claim 1, wherein the weapon is one or more of:
a firearm;
a long gun;
a handgun; and
a stun weapon.

10. The system of claim 1, wherein the ballistic vest further includes a real time location pendant to transmit real time location information; and
wherein the real time location information is disseminated from the real time location pendant to at least one of an emergency services provider and a monitoring station.

11. The system of claim 1, wherein the ballistic vest further includes a body camera to transmit video surveillance information; and
wherein the video surveillance information is disseminated from the body camera to at least one of an emergency services provider and a monitoring station.

12. The system of claim 1, wherein the weapon is a defensive spray.

13. The system of claim 1, further comprising:
a duress switch positioned with the enclosure;
wherein the duress switch is actuable to output a duress signal to the access mechanism; and
wherein the access mechanism in response to the duress signal disables the vault latching mechanism from unlocking the vault door for at least a predetermined period of time.

14. The system of claim 13, wherein the duress switch is actuable to output an alarm signal to at least one of an emergency services provider and a monitoring station.

15. A method for a rapid responder to access a response station in response to a triggering event, the response station including a vault containing a responder tool kit including a weapon, the method comprising:
providing the response station, wherein the response station comprises:
the vault, wherein the vault comprises:
a vault compartment defined by an interior surface of the vault;
a vault door attached to the vault;
a vault latching mechanism in communication with an access mechanism;
wherein the vault latching mechanism is selectively actuable by the access mechanism to lock and unlock the vault door;
wherein the vault compartment is accessible when the vault door is unlocked;
wherein the vault compartment is enclosed and not accessible when the vault door is locked;
the response station further comprising:
a portable cage assembly comprising:
a standalone cage structure;
a controller mounted to the standalone cage structure;
wherein biodata of at least one rapid responder is stored on the controller;
wherein the portable cage assembly is adjustable in size and removably positioned in the vault compartment such that the controller is:
physically accessible within the vault compartment; and
in communication with the vault latching mechanism;
a responder tool kit comprising:
a ballistic vest; and
the weapon;
wherein the responder tool kit is positioned within the standalone cage structure such that the responder tool kit is removable from the portable cage assembly when the vault door is unlocked;
the response station further comprising:
the access mechanism;
wherein the access mechanism comprises:
an enclosure attached to an exterior surface of the vault;
a biometric authentication device enclosed within the enclosure such that the biometric authentication device is accessed by opening the enclosure;
a token-based authentication device;
wherein the token-based authentication device is located outside the enclosure and is actuable by presentation of an authorized authentication token to open the enclosure;
wherein the authorized authentication token is associated with at least one rapid responder authorized to access the vault compartment;
wherein the biometric authentication device is actuable by biodata of the at least one rapid responder authorized to access the vault compartment; and
wherein actuation of the biometric authentication device by the biodata of the at least one rapid responder actuates the access mechanism to contemporaneously:
actuate the vault latching mechanism to unlock the vault door such that the responder tool kit is removable from the vault compartment by the at least one rapid responder; and
output an alarm signal to at least one of an emergency services provider and a monitoring station;
the method further comprising:
presenting an authentication token to the token-based authentication device;

determining, using the access mechanism, whether the authentication token is the authorized authentication token;

opening the enclosure when the authentication token is determined to be the authorized authentication token, such that when the enclosure is opened, the biometric authentication device is accessible;

receiving, using the biometric authentication device, biodata inputted to the biometric device;

determining, using the access mechanism, whether the biodata inputted to the biometric device is the biodata of the at least one rapid responder authorized to access the vault compartment; and when the biodata inputted to the biometric device is determined to be the biodata of the at least one rapid responder authorized to access the vault compartment, using the access mechanism to contemporaneously:

actuate the vault latching mechanism to unlock the vault door such that the responder tool kit is removable from the vault compartment by the at least one rapid responder; and output the alarm signal to at least one of an emergency services provider and a monitoring station.

16. The method of claim 15, the method further comprising:

accessing the vault compartment; and establishing a verbal communication link, via a communication module positioned in the vault compartment, with at least one of an emergency services provider and a monitoring station.

17. The method of claim 16, wherein:

the responder tool kit includes a portable communication device electrically connected to a tool kit charging module located in the vault compartment;

the method further comprising:

disconnecting the portable communication device from a tool kit charging station; and removing the responder tool kit from vault compartment.

18. The method of claim 17, wherein the portable communication device comprises one or more of:

a two-way radio;
a cellular phone;
a real time location pendant; and
a body worn camera.

19. The method of claim 15, further comprising:

sensing, via an inventory sensor, removal of the responder tool kit from the vault compartment; and activating a beacon located external to the vault and proximate to the vault when removal of the responder tool kit from the vault compartment is sensed by the inventory sensor.

20. The method of claim 15, wherein the cage assembly includes a tool kit holder to position the responder tool kit in the vault compartment.

21. The method of claim 15, further comprising:

enrolling the at least one rapid responder in an enrolled user database;

storing the biodata of the at least one rapid responder in the enrolled user database;

evaluating the at least one rapid responder using predetermined criteria at time of enrollment and periodically thereafter; and designating the at least one rapid responder as one of authorized and unauthorized in the enrolled user database as determined by the predetermined criteria;

providing the biodata of the at least one rapid responder to the access mechanism only when the at least one rapid responder is designated as an authorized rapid responder; and removing the biodata of the at least one rapid responder from the access mechanism when the at least one rapid responder is designated as an unauthorized rapid responder.

22. The method of claim 15, wherein the weapon is one or more of:

a firearm;
a long gun;
a handgun; and
a stun weapon.

23. The method of claim 15, wherein the weapon is a defensive spray.

24. The method of claim 15, further comprising:

accessing the responder tool kit in response to the triggering event;

wherein the triggering event is an active shooter event including an active shooter; and taking action to at least one of deter, impede, disarm and immobilize the active shooter using the responder kit.

25. The method of claim 15 wherein the responder tool kit further comprises a trauma kit, the method further comprising:

accessing the responder tool kit in response to the triggering event;

wherein the triggering event is an active shooter event;

retrieving a trauma kit from the vault; and taking action to provide emergency medical treatment to a victim of the active shooter event using the trauma kit.

26. The method of claim 15, further comprising:

accessing the responder tool kit in response to the triggering event;

wherein the triggering event is an active shooter event; and initiating a defensive response to the active shooter event to reduce damage resulting from the active shooter event.

27. The method of claim 26, wherein the defensive response is initiated prior to at least one of:

a notification to emergency response services of the triggering event; and a response by emergency response services to the triggering event.

28. A system for a rapid responder to access a response station in response to a triggering event to retrieve a responder tool kit including a weapon, the response station including a vault containing the responder tool kit, the system comprising:

the response station comprising:

the vault, wherein the vault comprises:

a vault compartment defined by an interior surface of the vault;

a vault door attached to the vault;

a vault latching mechanism;

wherein the vault latching mechanism is selectively actuable by a controller to lock and unlock the vault door;

wherein the vault compartment is accessible when the vault door is unlocked;

wherein the vault compartment is enclosed and not accessible when the vault door is locked;

the response station further comprising:

a portable cage assembly comprising:

a standalone cage structure;
the controller mounted to the standalone cage structure;
wherein biodata of at least one rapid responder is stored on the controller;
a responder tool kit positioned in the standalone cage structure, the responder tool kit comprising:
a ballistic vest; and
the weapon;
wherein the responder tool kit is positioned in the standalone cage structure such that the responder tool kit is removable from the portable cage assembly when the vault door is unlocked;
wherein the portable cage assembly is adjustable in size and removably positioned in the vault compartment such that the controller is:
physically accessible within the vault compartment; and
in communication with the vault latching mechanism;
the response station further comprising:
an access mechanism mounted to an exterior surface of the vault;
wherein the access mechanism is in communication with controller;
wherein the access mechanism includes a first authentication device and a second authentication device;
wherein the second authentication device is a biometric authentication device contained within an enclosure;
wherein authentication of an authorized authentication token presented to the first authentication device is required to access the enclosure containing the second authentication device;
wherein authentication of biodata received by the second authentication device is performed by the controller by comparison of the biodata received by the second authentication device to the biodata of the at least one rapid responder stored on the controller;
wherein the controller upon matching the biodata received by the second authentication device to the biodata of the at least one rapid responder stored on the controller is actuated to contemporaneously:
actuate the vault latching mechanism to unlock the vault door such that the responder tool kit is removable from the cage assembly by the at least one rapid responder; and
output an alarm signal to at least one of an emergency services provider and a monitoring station.

29. The system of claim 28, wherein the portable cage assembly further comprises an uninterruptible power supply attached to the standalone cage structures and electrically connected to the controller; and
wherein the uninterruptible power supply in an installed condition in the vault compartment is electrically connected to a power source which is external to the vault.

30. The system of claim 29, further comprising:
a tool kit charging module attached to the standalone cage structure and electrically connected to the uninterruptible power supply;
a portable communication device; and
wherein the portable communication device is located on the ballistic vest and is electrically connected to the tool kit charging module.

31. The system of claim 28, wherein the access mechanism further includes a duress switch located inside the enclosure and is in communication with the controller;
wherein the duress switch is activated by manual input; and
wherein activating the duress switch initiates at least one of:
the controller communicating a duress call to at least one of an emergency services provider and a monitoring station; and
the controller disabling the vault latching mechanism from unlocking the vault door for a minimum period of time.

* * * * *